United States Patent [19]
Li

[11] Patent Number: 6,118,893
[45] Date of Patent: Sep. 12, 2000

[54] ANALYSIS OF AN IMAGE OF A PATTERN OF DISCRETE OBJECTS

[75] Inventor: David Li, West Roxbury, Mass.

[73] Assignee: Cognex Corporation, Natick, Mass.

[21] Appl. No.: 08/895,052

[22] Filed: Jul. 16, 1997

[51] Int. Cl.[7] .............................. G06K 9/52; G06T 3/00
[52] U.S. Cl. ......................... 382/150; 382/151; 382/294
[58] Field of Search .................................. 382/146, 149, 382/142, 151, 168, 173, 124–126, 289, 291, 150, 294, 433, 434, 435, 436, 437, 438, 439; 345/433, 434, 435, 436, 437, 438, 439; 348/94, 87, 126, 130; 356/375; 250/559.29, 559.3, 559.34, 559.37

[56] References Cited

U.S. PATENT DOCUMENTS

| | | | |
|---|---|---|---|
| 4,803,735 | 2/1989 | Nishida et al. ......................... | 382/151 |
| 5,067,162 | 11/1991 | Driscoll, Jr. et al. ....................... | 382/5 |
| 5,465,152 | 11/1995 | Bilodeau et al. ........................ | 356/371 |
| 5,550,763 | 8/1996 | Michael et al. .......................... | 364/582 |
| 5,574,668 | 11/1996 | Beaty ....................................... | 364/558 |
| 5,652,658 | 7/1997 | Jackson et al. .......................... | 356/398 |
| 5,694,482 | 12/1997 | Maali et al. ............................. | 382/151 |
| 5,870,489 | 2/1999 | Yamazaki et al. ....................... | 382/151 |

FOREIGN PATENT DOCUMENTS

WO 95/11519   4/1995   WIPO .

OTHER PUBLICATIONS

Caracappa, "On Improving BGA Reliability and Quality", Surface Mount Technology, Jun. 1997, pp. 44–46.

"ICOS Component Checker For BGA Inspection" specification sheets; "ICOS 2–Dimensional BGA Inspection System" specification sheets, ICOS Vision Systems, Apr. 3, 1996.

"Normalized Correlation Coefficient", R.A. Hoggenboom, Apr. 17, 1996,/http://www.wi.leidenuniv.nl./~rhoogenb/node26.html, 2 pages.

"Affine Transformations", University of Waterloo/http://www.undergrat.math.unwaterloo.ca/~cs488/ln.HTML/Affinenode.html, 3 pages.

Deley et al., "Accurate Placement of Ball Grid Array Packages," reprinted from *Electronic Packaging & Production*, Apr. 1996, Cahners Publishing Company, Newton, MA, USA.

Hager, William W., "Chapter 6 Eigenproblems, Section 6–11 The Singular Value Decomposition and the Pseudoinverse," *Applied Numerical Linear Algebra*, 1988, pp. 294–303, Prentice Hall, Englewood Cliffs, NJ, USA.

Thomas, Jr., George B., "Chapter 14 Partial Differentiation," *Calculus and Analytic Geometry*, 1953, pp. 481–532, Addison–Wesley Publishing Company, Inc., Cambridge, MA, USA.

(List continued on next page.)

*Primary Examiner*—Leo H. Boudreau
*Assistant Examiner*—Brian P. Werner
*Attorney, Agent, or Firm*—Anthony L. Miele; Tracy M. Calabresi; Russ Weinzimmer

[57] ABSTRACT

An image of an actual pattern of discrete objects is analyzed with respect to a model representing a predefined ideal pattern of objects. Initial processing is performed on only a portion of the image associated with ones of the objects located in an original neighborhood within the image to determine information about an affine transformation of the actual pattern of the discrete objects relative to the predefined ideal pattern. Additional processing is performed on other portions of the image based on the results of the initial processing. Initial processing is performed with respect to a first part of the image by operating on only a first portion of all of the digital data that represents that first part of the image. Later additional processing is performed with respect to another part of the image by operating on only a second portion of all of the digital data that represents that other part of the image, the second portion being relatively smaller than the first portion so that the additional processing is less intensive than the initial processing.

9 Claims, 23 Drawing Sheets

OTHER PUBLICATIONS

Cognex Corporation, Chapter 7 Mathematics, Coordinate Transformation by Pseudoinverse, *Cognex 3000/4000/5000 System Software*, 1996, pp. 204–210, Revision 7.4 590–0134, Natick, MA.

Cognex Corporation, "Chapter 1 Searching, Correlation Searching," *Cognex 300/4000/5000 Vision Tools*, 1996, pp.17–25, Revision 7.4 590–0136, Natick MA.

Cognex Corporation, "Chapter 11 Ball Grid Array Device Inspection," *SMD Placement Guidance Product User's Manual*, 1996, pp. 213–246, Release 2.3.00 590–1039, Natick MA.

Ballard, D.H., "Generalizing the Hough Transform to Detect Arbitrary Shapes*," *Pattern Recognition*, 1981, pp. 111–122, vol. 13, No. 2, Pergamon Press Ltd., UK.

Grimson et al., "On the Sensitivity of the Hough Transform for Object Recognition," *IEEE Transactions on Pattern Analysis and Machine Intelligence*, Mar. 1990, pp. 255–274, vol. 12. No. 3.

Strang, Gilbert, "Chapter 3 Orthogonal Projections and Least Squares, Section 3.4 The Pseudoinverse and the Singular Value Decomposition," *Linear Algebra and Its Applications, Second Edition*, 1980, Academic Press, Inc., New York, NY USA.

Silver et al., "Practical Golden Template Comparison," *Cognex Corporation*, Jun. 6, 1990, pp. 2–11, Needham, MA, USA.

"RVSI Vanguard Products," http://www.vai.net/products/products./htm, pp. 1–2, Jun. 3, 1998.

"RVSI Vanguard VAi 5020," http://www.vai.net/products/prod01.htm3 pp. 1–4, Aug. 3, 1998.

"RVSI Vanguard VAi 5200/VAi 5300," http://www.vai.net/products/prod02.htm, pp. 1–4, Jul. 30, 1998.

"RSVI Vanguard VAi 6300," http://www.vai.net/products/6300.htm3 pp. 1–5, Oct. 14,1998.

Fig. 4

PATTERN ELEMENT DATA STRUCTURE  102

| NAME | VALUE |
|---|---|
| 26 — ALPHA VALUE | 60.0 |
| 28 — BETA VALUE | 43.6 |
| 36 — ANGLE VALUE | 76 |
| | |
| | |

Fig. 5

PATTERN PARAMETERS DATA STRUCTURE  120

| | |
|---|---|
| 54 { MODEL ITEM (0.0) ACTIVATION INDICATOR | ON |
| . . . | |
| MODEL ITEM (6.5) ACTIVATION INDICATOR | OFF |
| 50 — ALPHA FACTOR VALUE | 7 |
| 52 — BETA FACTOR VALUE | 6 |
| | |

Fig. 6

ANALYSIS PARAMETERS DATA STRUCTURE  106

| | |
|---|---|
| 51 — PITCH | |
| 53 — WIDTH | |
| . . . | |
| | |
| | |
| | |

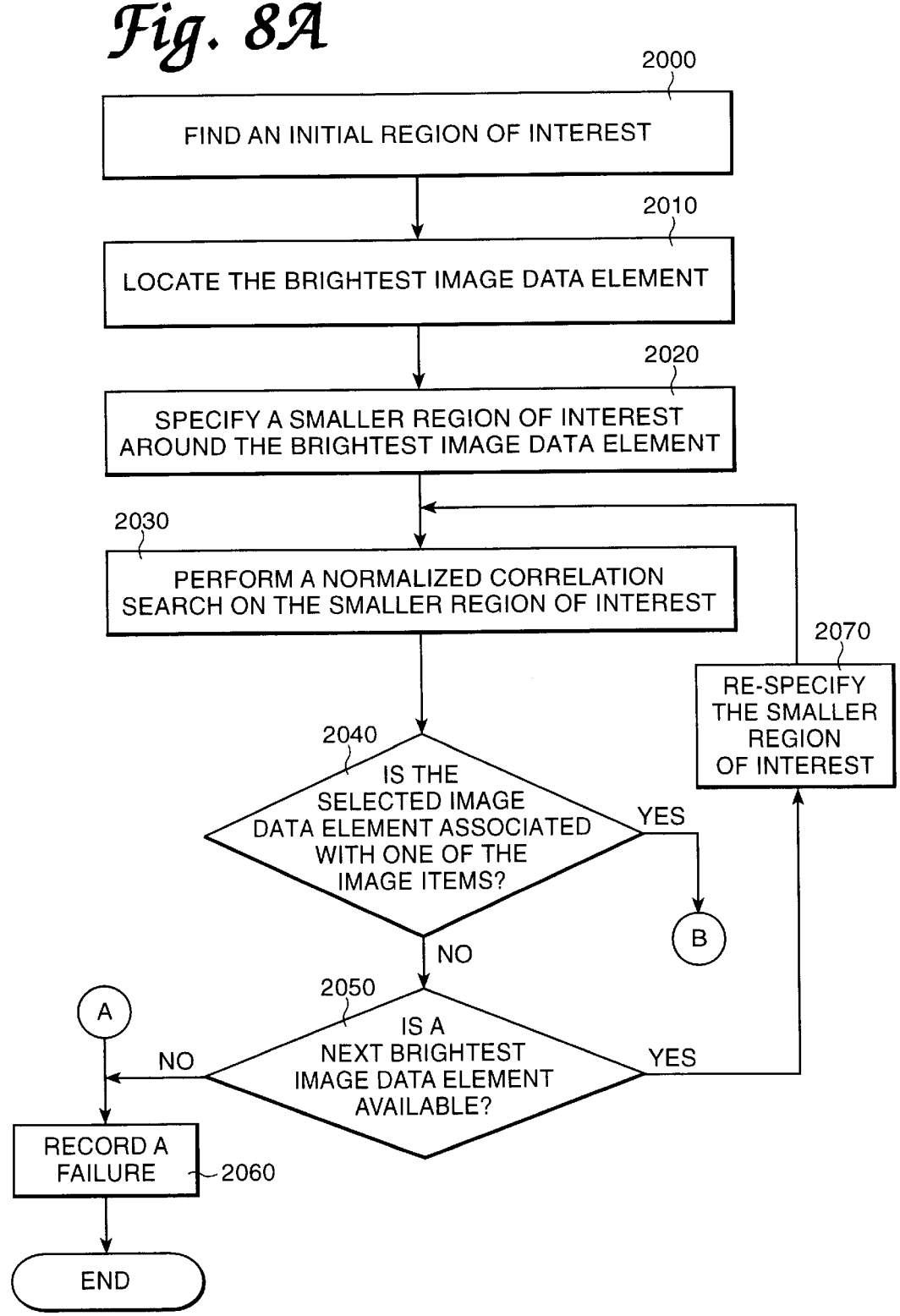

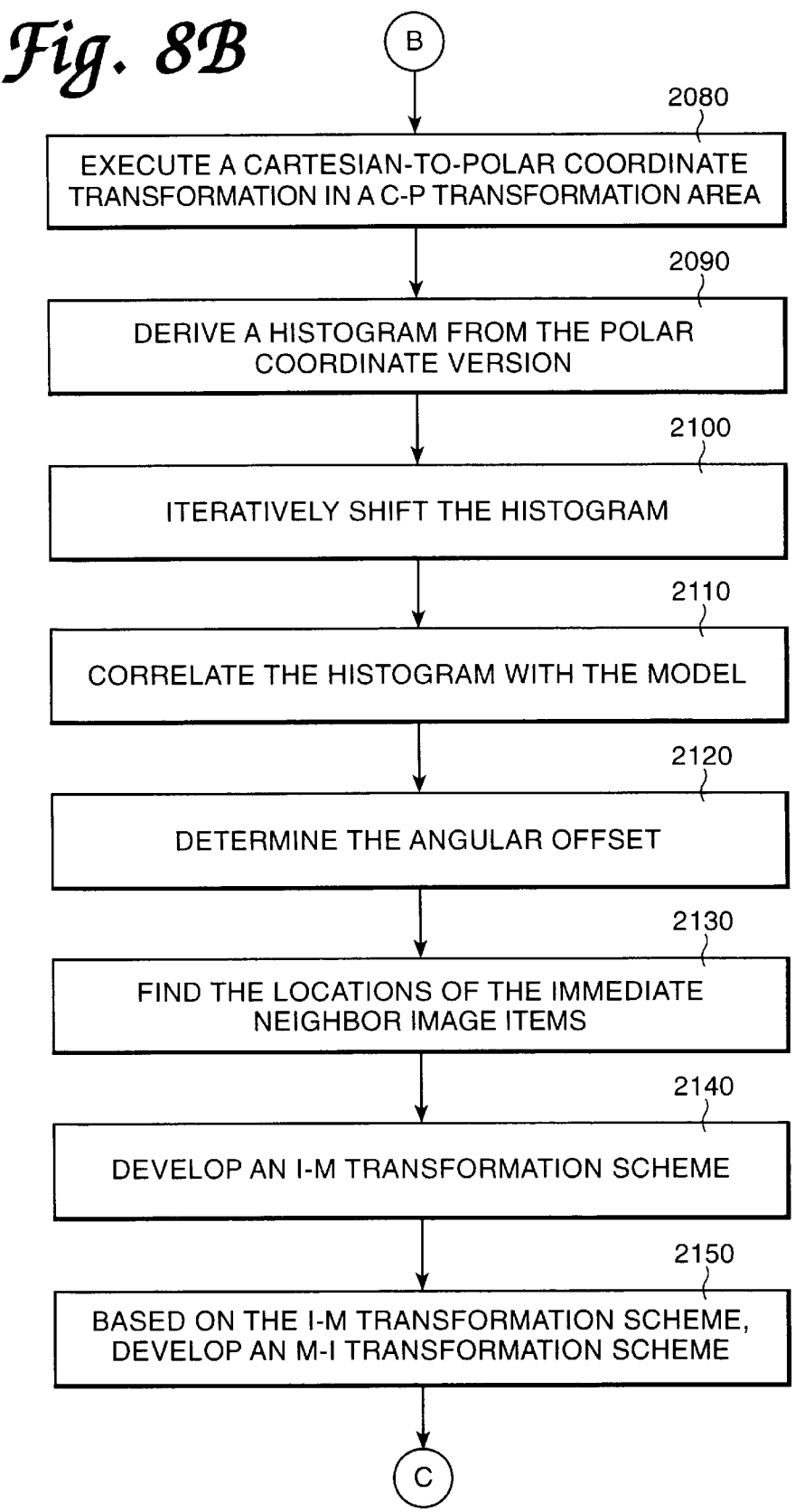

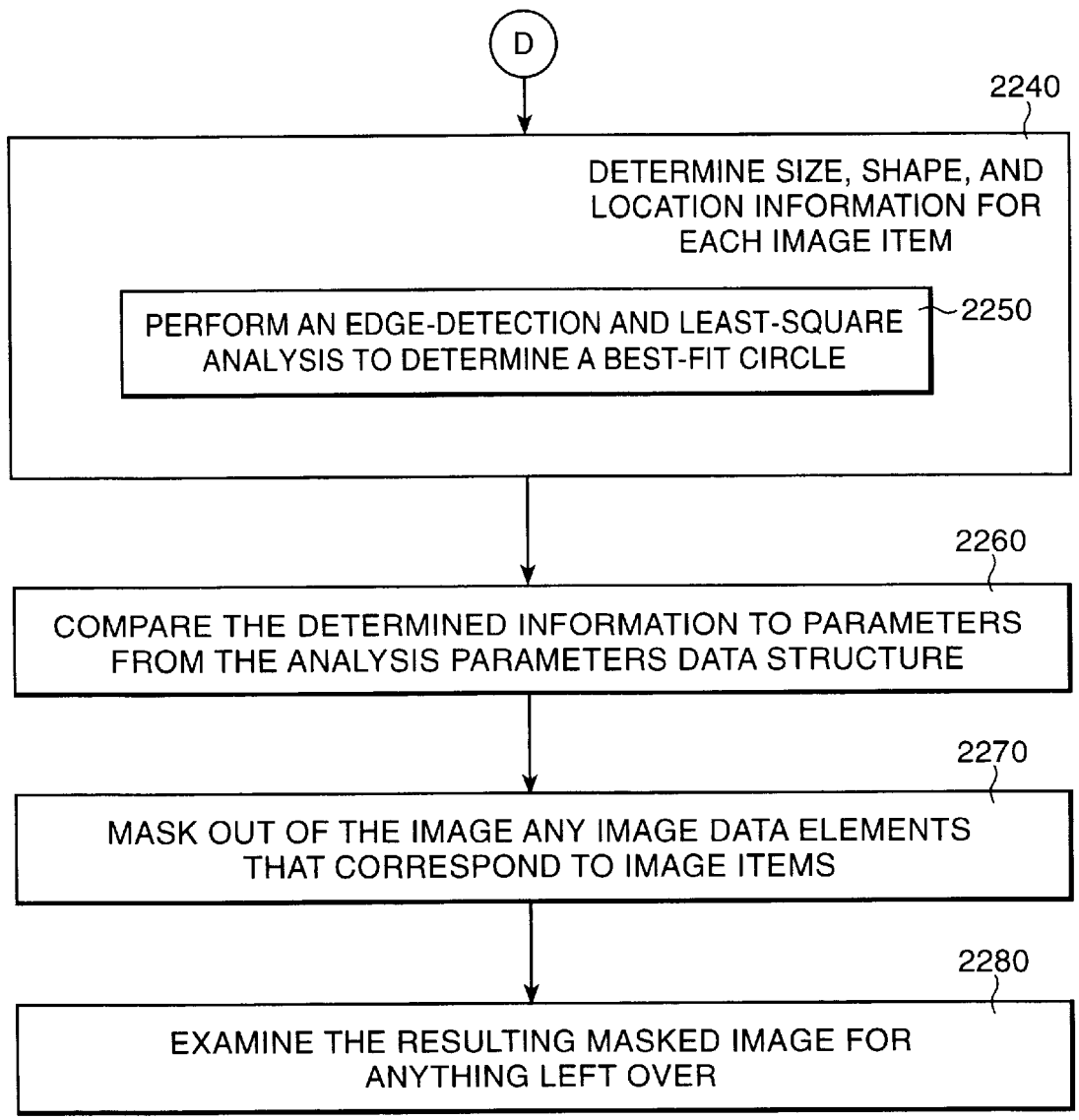

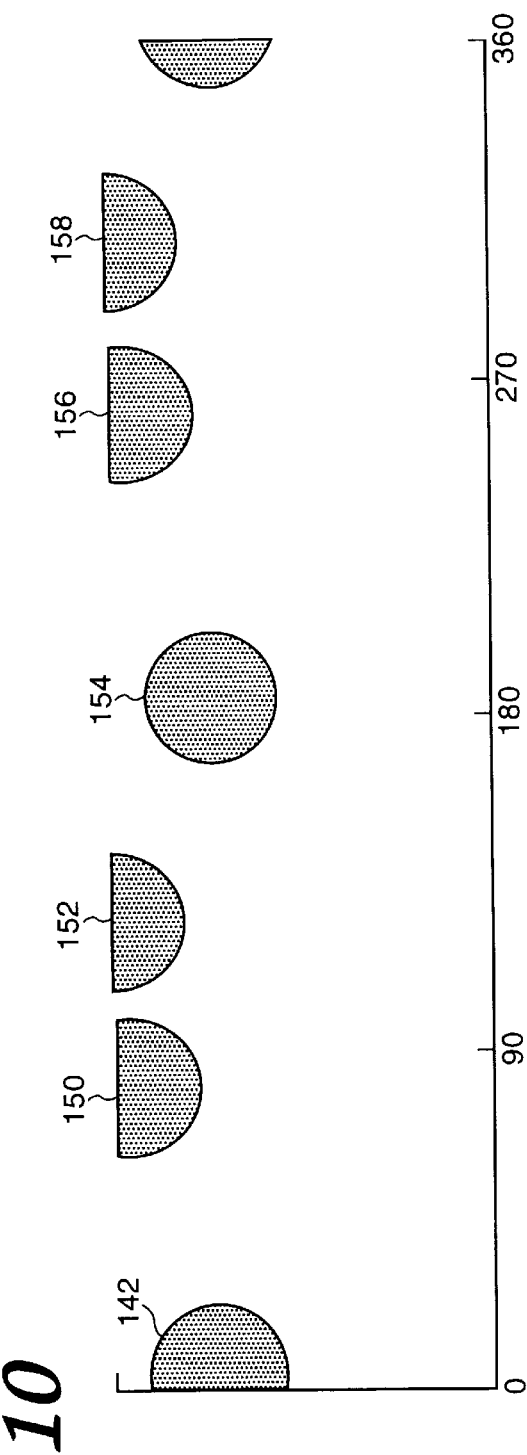
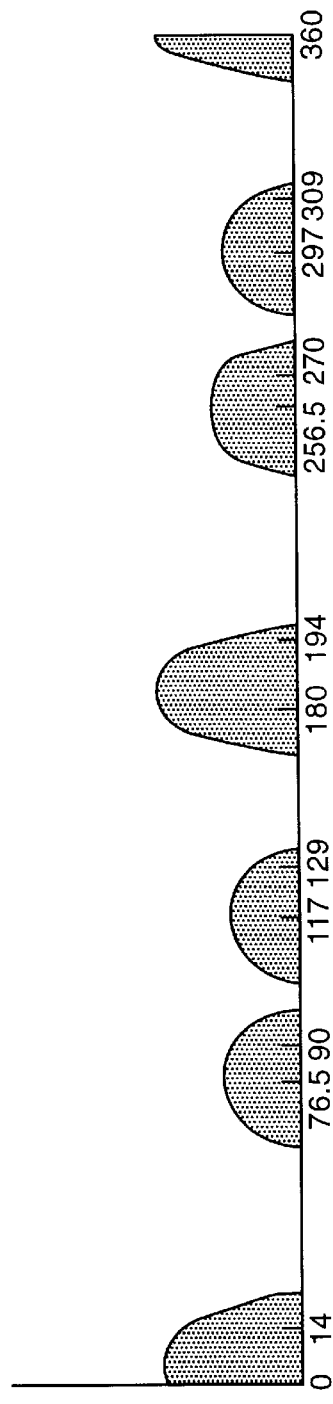
Fig. 10
Fig. 11

6,118,893

ANALYSIS OF AN IMAGE OF A PATTERN OF DISCRETE OBJECTS

BACKGROUND OF THE INVENTION

The invention relates to analyzing images.

Many people have had the experience of purchasing a product that is expected to include items or attributes in a predetermined pattern, and of finding that the article's usefulness is diminished by a defect relating to the pattern. If the product is meant to be a component in another product, the pattern-related defect may ruin the second product.

For this reason, products incorporating such predetermined patterns may be inspected for the compliance of the pattern with some standard. Examples include ball grid array devices, micro ball grid arrays, flip chips, and chip-scale packages (together called "BGAs"). BGAs share a common feature in that the contacts on the device are metallic balls that are mounted on one side of the device for forming electrical connections between the package's integrated circuit and a printed circuit board.

To work properly, the balls of BGAs should be properly located to connect to the pads on the circuit board. The balls also should be properly formed (i.e., should have a spherical shape and neither too much nor too little solder, to allow an acceptable electrical connection). The balls also should not be connected by extraneous solder or other material in the spaces between the balls. If these conditions are not met, the BGA may fail to make proper electrical connections or physical durable bonds.

Unlike traditional leaded devices that have contacts exposed on perimeters where some types of defects (e.g., solder bridges or missing solder) can be detected even after soldering, BGAs are harder to inspect after mounting on a circuit board. BGAs therefore are inspected before mounting, either in fully-assembled form or by inspection of ball arrays that are about to be attached to the packages of integrated circuits.

Similar inspections are done on other types of products, e.g., pill blister packs and candy sampler boxes.

SUMMARY OF THE INVENTION

In general, in one aspect, the invention features a computer-based method of analyzing an image of an actual pattern of discrete objects with respect to a model representing a predefined ideal pattern of objects. Initial processing is performed on only a portion of the image associated with ones of the objects located in an original neighborhood within the image to determine information about an affine transformation of the actual pattern of the discrete objects relative to the predefined ideal pattern. Additional processing is performed on other portions of the image based on the results of the initial processing. Thus, initial affine-related analysis of the image need not involve the entire image, which saves time and computing resources. In addition, the information about the affine transformation may be leveraged to facilitate the determination of other information about the image.

Implementations of the invention may include one or more of the following features. The objects may comprise balls of a ball grid array. The image may be a set of digital data representing an array of pixels of the image; and the pattern of objects may be arranged on a regular (e.g., rectangular) grid. The initial processing may include identifying a first one of the objects in the image, and identifying locations of adjacent others of the objects in the original neighborhood relative to the first object. The locations of the first object and the adjacent objects may be analyzed to determine the information about the affine transformation. The locations of the adjacent objects may be expressed relative to the first object in radial and angular coordinates. The angular coordinate information may be matched against the model to determine a rotational element of the affine transformation. The radial coordinate information may be matched against the model to determine a scalar element of the affine transformation. It is possible to operate only on information of the image that is within a window in the vicinity of one of the adjacent objects, to produce results that may form a basis for determining the radial coordinate information.

The model may express the locations of the objects in terms of vectors which represent standard spacings of the objects along two dimensions and fill information indicating the existence or nonexistence of an object at each location of an array defined by the vectors. The additional processing may include deriving information about additional ones of the objects located in other portions of the image that are farther away from the one object than are the objects in the original neighborhood. Then less processing may be required for objects that are more distant from the one object.

Object inspection may be performed by comparing the object in the image against a predefined standard.

In general, in another aspect, initial processing is performed with respect to a first part of the image by operating on only a first portion of all of the digital data that represents that first part of the image. Later additional processing is performed with respect to another part of the image by operating on only a second portion of all of the digital data that represents that other part of the image, the second portion being relatively smaller than the first portion so that the additional processing is less intensive than the initial processing.

Other advantages and features will become apparent from the following description and from the claims.

BRIEF DESCRIPTION OF THE DRAWINGS

FIGS. 4–6 are diagrams of data structures.

FIGS. 7, 8A–8D are flow diagrams of computer procedures.

FIGS. 10–11 are diagrams of mathematical transformations of the image of FIG. 9.

DESCRIPTION OF THE PREFERRED EMBODIMENTS

Figure 1:
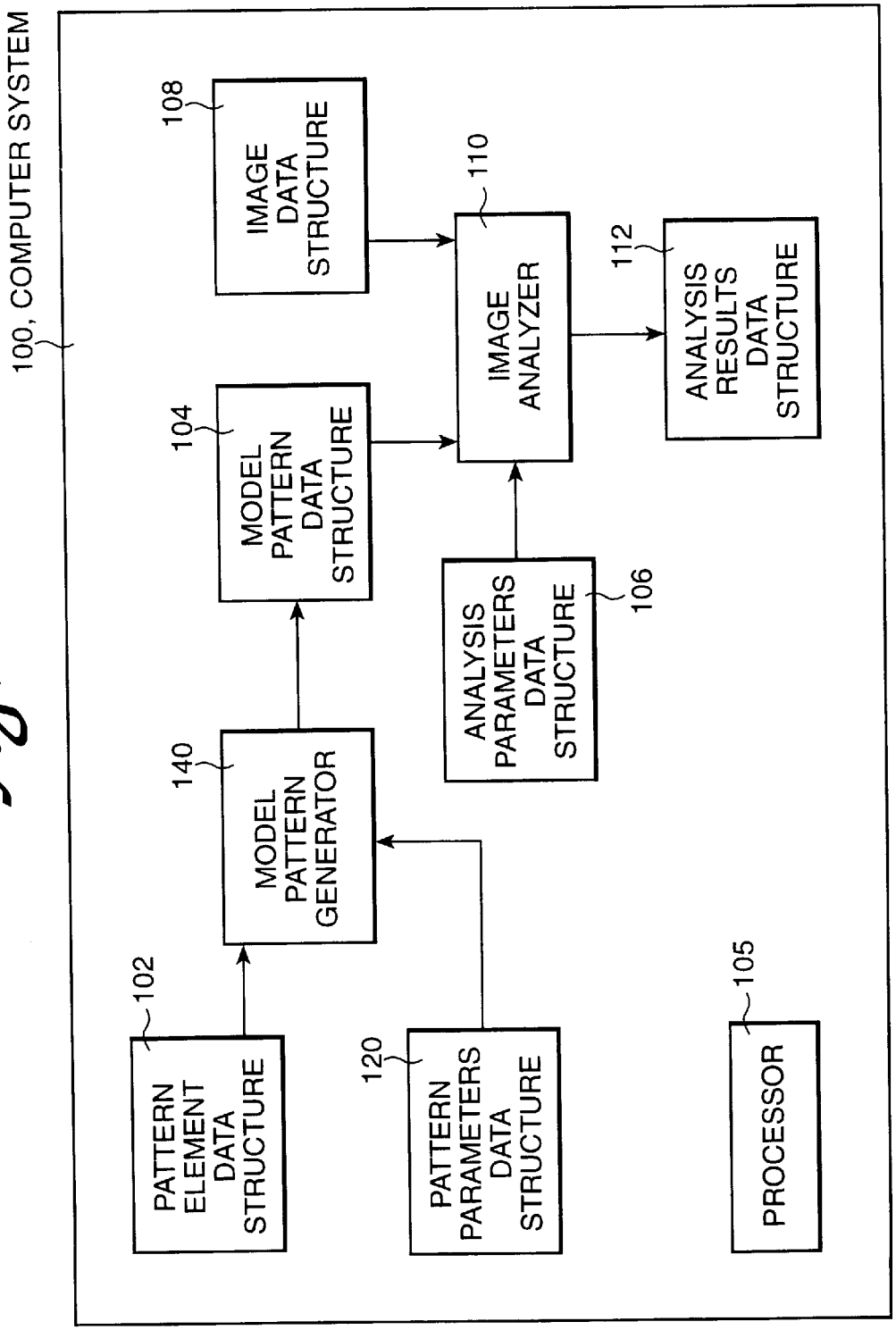
FIG. 1 is a block diagram of a computer system.

In FIG. 1, a computer system 100 is used to analyze the contents of an image data structure 108, e.g., a stored computer file in an image data element based format such as ".BMP" format. A model pattern generator 140 uses the contents of a pattern element data structure 102 (FIG. 4) and a pattern parameters data structure 120 (FIG. 5) to generate a model pattern data structure 104 that represents a predefined ideal pattern of objects. The computer system has an image analyzer 110 that analyzes the contents of the image data structure based on the contents of an analysis parameters data structure 106 (FIG. 6) and the model pattern data structure, to produce the contents of an analysis results data structure 112.

Figure 2:
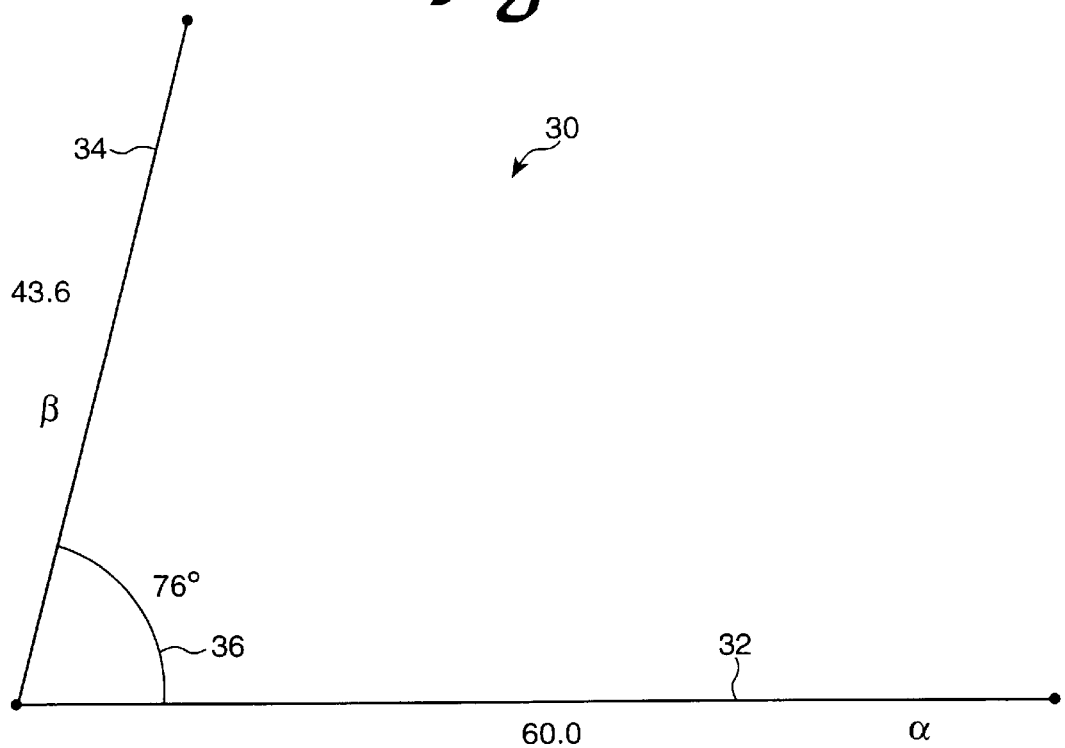
FIG. 2 is a diagram of a pattern element.
Figure 3:
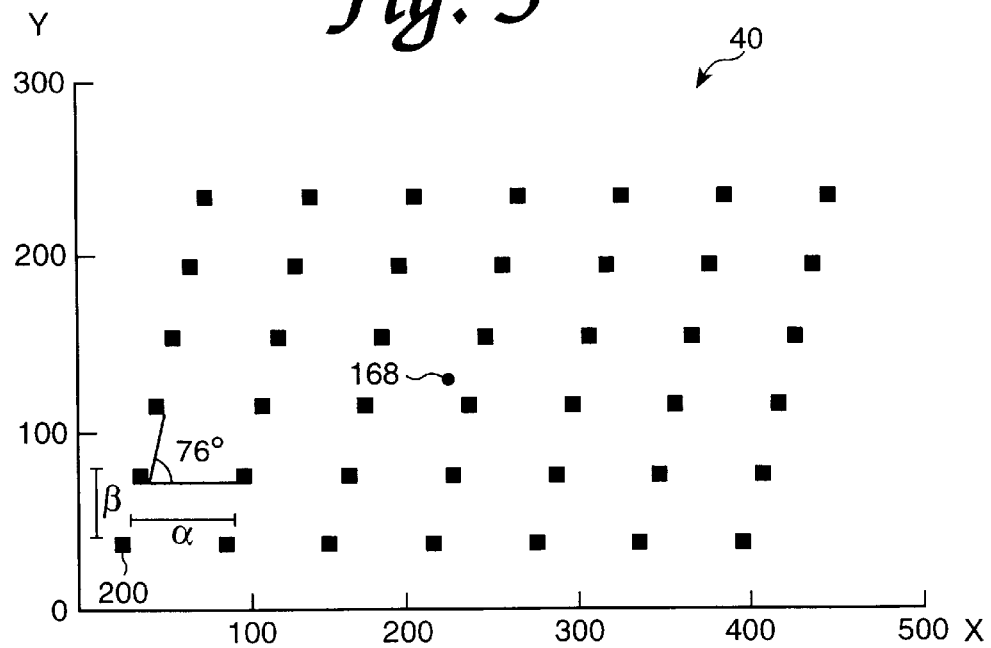
FIG. 3 is a diagram of a model pattern based on the pattern element.

FIG. 4 illustrates the pattern element data structure, which includes an alpha value 26 (here, 60.0), a beta value 28 (here, 43.6), and a pattern angle value 36 (here, 76 degrees). As shown in FIG. 2, the alpha, beta, and pattern angle values define the pattern element 30 that includes alpha and beta segments (i.e., vectors) 32 and 34 arranged in two dimensions and respectively having lengths defined by the alpha and beta values. The alpha and beta segments are disposed at a pattern angle 36 corresponding to the pattern angle value. As shown in FIG. 3, a model pattern 40 is defined in part by the pattern element.

Figure 7:
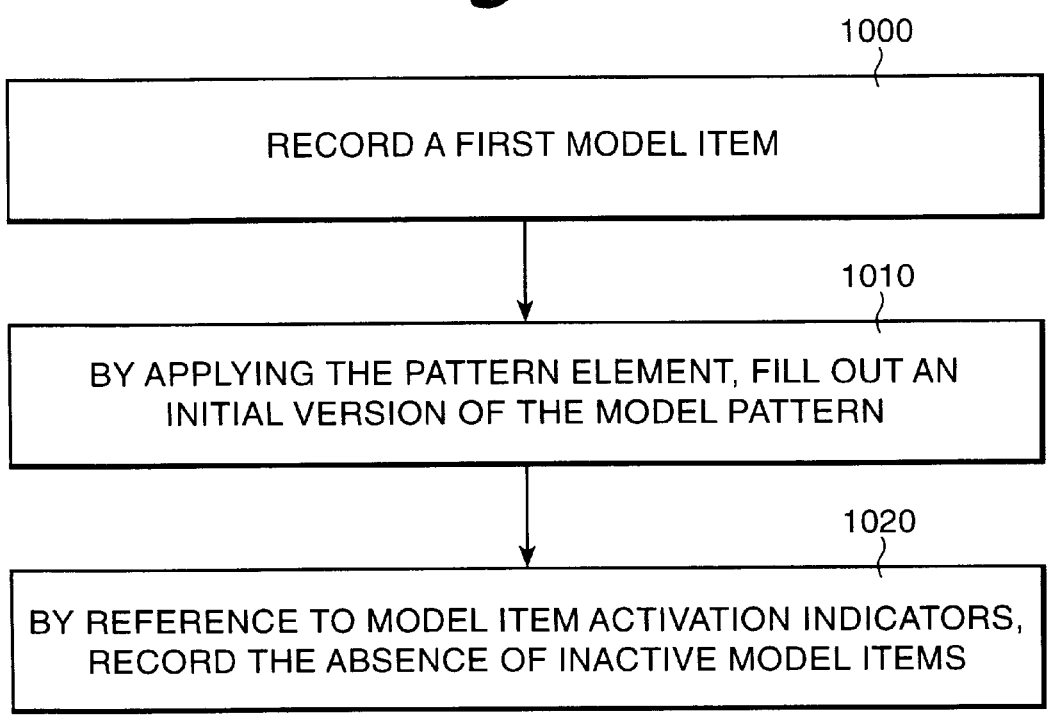
Figure 8C:
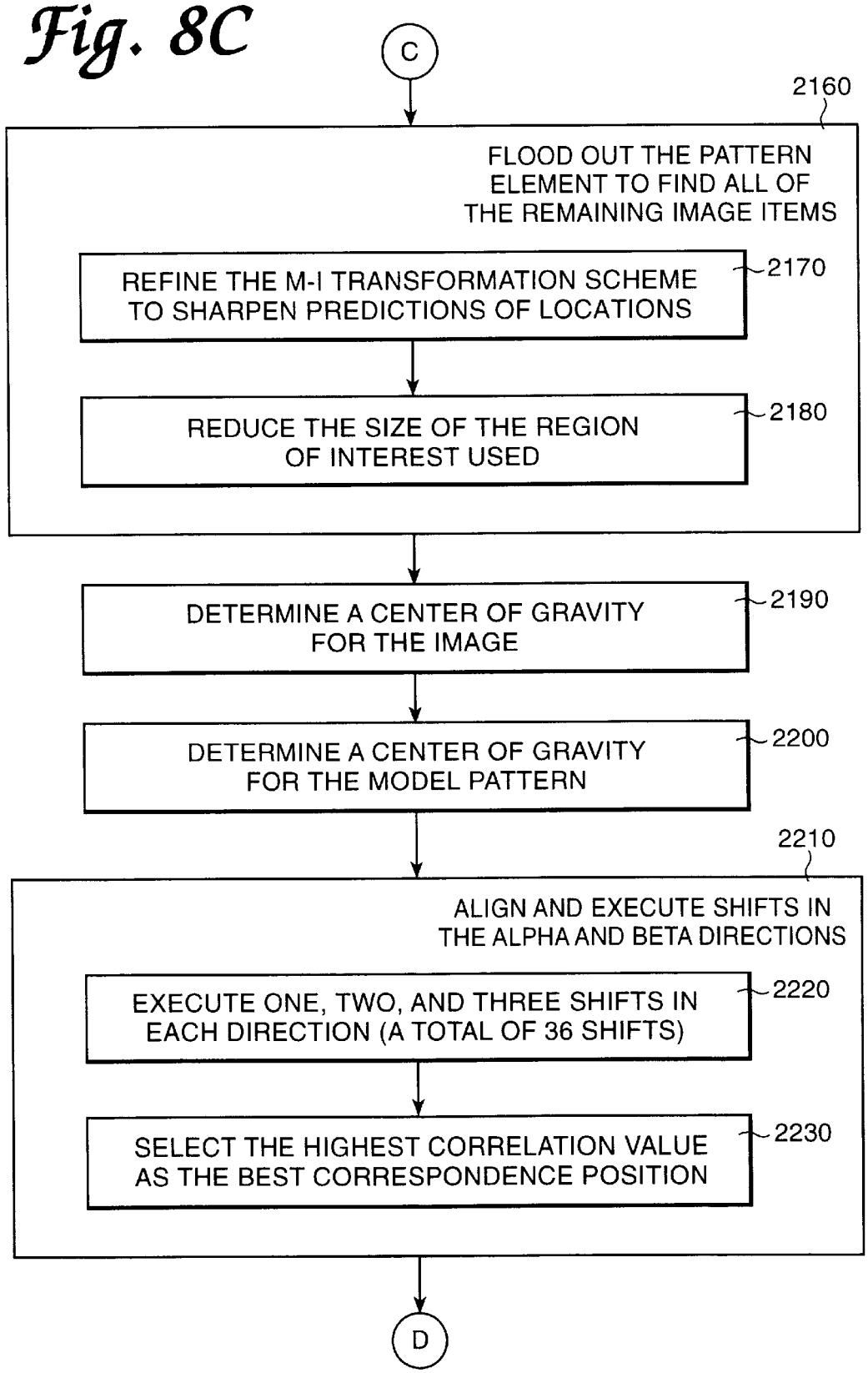

FIG. 7 illustrates a procedure followed by the model pattern generator to create the contents of the model pattern data structure which defines the model pattern. First, in the model pattern data structure, the pattern generator records a first model item, exemplified in FIG. 3 as model item 200 which is referenced as model item (0,0) (step 1000). Then, by applying the pattern element (which defines standard spacings between model items) numbers of times indicated by alpha and beta factor values 50, 52 (here, the model pattern's dimensions in terms of alpha and beta segments, respectively) stored in the pattern parameters data structure, the pattern generator can complete (by "filling out") an initial version of the model pattern (step 1010). The model pattern is made complete by referring to model item activation indicators 54 in the pattern parameters data structure to record in the model pattern data structure the absence of model items predetermined to be inactive (step 1020). For instance, in FIG. 3, model item (6,5) is absent (see FIG. 5).

Using the model pattern, the computer system can analyze an image represented by the contents (provided, e.g., from a camera as explained below) of the image data structure in accordance with a procedure illustrated in FIGS. 8A–8D. (It is to be understood that the "image"—also known as an actual pattern of discrete objects—refers to any information organized by position and at least one additional attribute of interest such as brightness, color, quality, humidity, height, depth, or concentration. For example, the "image" may include topological information corresponding to a relief map or a navigational chart.)

Figure 9:
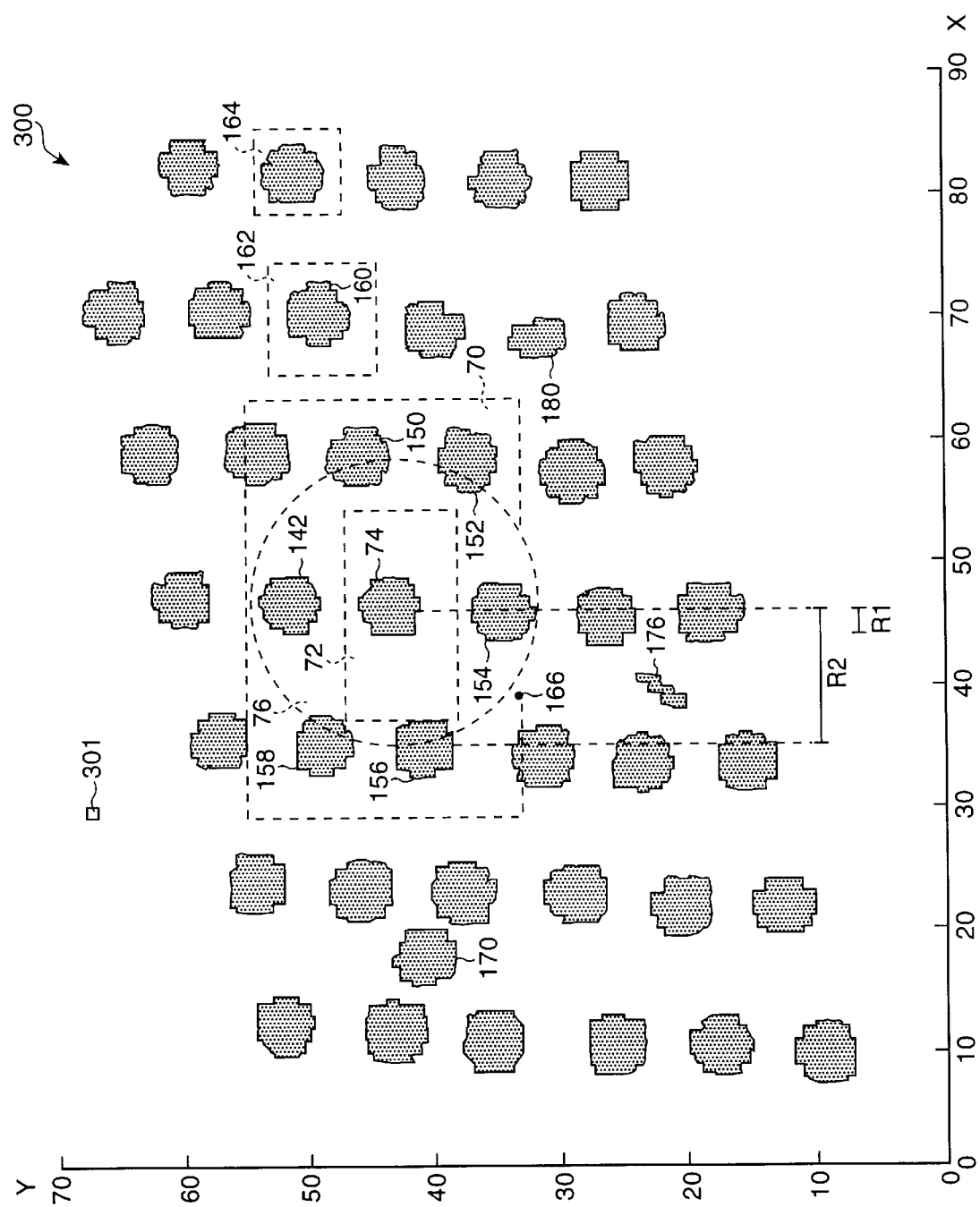
FIG. 9 is a diagram of a digital image.

An example 300 of such an image (e.g., a set of digital data representing an array of pixels) is shown in FIG. 9, in which each grid element such as grid element 301 represents an image data unit (e.g., a pixel). Preferably, each image data unit has a brightness level value (e.g., ranging from 0 which indicates a darkest level to 255 which indicates a brightest level). For illustration, FIG. 9 shows image 300 in the inverse (i.e., the darkened grid elements represent brighter image data elements and the undarkened grid elements represent darker image data elements). Also, FIG. 9 indicates an intermediate brightness level (i.e., a level between the darkest and lightest levels found in the surrounding area) of an image data element by leaving a portion of the corresponding grid element undarkened. For example, some image data elements with intermediate brightness levels are found around the edges of image objects in FIG. 9. (Also, it is to be understood that "brightness level" refers to the value of the attribute of interest. For example, a particular "brightness level" may in fact correspond to a particular height.)

In accordance with the procedure of FIGS. 8A–8D, the image analyzer locates the objects of interest in the image, determines affine characteristics ("affine" being defined to refer to skew, rotation, translation, and scale) of the image in relation to the model pattern, analyzes the correspondence between the image and the model pattern, and analyzes the quality of the objects of interest in the image. The results of the quality analysis and preferably at least one of the affine characteristics are recorded in the analysis results data structure. The objects of interest include not only image items (also known as discrete objects) corresponding to the model items of the model pattern but also other objects as indicated below. In the analysis parameters data structure, a pitch value 51 indicates the expected image item pitch (i.e., the expected distance between the centers of the image items) and a width value 53 indicates the expected image item width (or diameter, for circular image items).

First, an initial region of interest such as region or neighborhood 70 (FIG. 9) is found (step 2000). Preferably, the initial region of interest is predefined to be an area (e.g., near the center of the image) likely to be highly populated with image items and has at least one dimension (expressed as a number of image data elements) that is expected to be equal to about six times the pitch value for the image items. In the initial region of interest, each image data element is spatially-averaged (as explained below) by the width value to rank the image data elements in order of brightness and thus locate the brightest image data element, e.g., element (45,42), which is expected to be associated with an image item (step 2010).

Spatial-averaging involves, for each image data element, taking the average of the brightness values of a set of the image data element's neighboring image data elements. The size of the set may be determined by a value such as the width value.

Turning back now to the original image (not any spatially-averaged version of the image), a smaller region of interest such as region or neighborhood 72 (FIG. 9) is then specified around the brightest image data element (step 2020). On the smaller region of interest, a normalized correlation search attempt (explained below) is performed (step 2030) to determine whether the brightest image data element is associated with one of the image items (step 2040). If not, a procedural loop (steps 2050–2070) is executed to find an image data element so associated.

In the procedural loop, it is first determined whether a next brightest image data element is available (step 2050). Such an image data element is available if attempts have been made with less than a preset maximum number of image data elements (e.g., 10 image data elements), and there is an image data element available for selection that would not have been found by the normalized correlation that was executed in connection with the last attempt. If such an image data element is not available, an analysis failure is recorded in the analysis results data structure (step 2060) to indicate that none of the initial region of interest's image data elements is associated with one of the image data items; and the procedure terminates. However, if a next brightest image data element is available, the smaller region of interest is re-specified around the next brightest image data element (step 2070) and another normalized correlation search attempt is performed (step 2030).

Thus, an initial image item such as image item 74 is identified and its location specified by its central image data element, which is the initial image item's "center of gravity", e.g., element (46,43) for image item 74. Alternatively, the initial image item may be so identified by executing a connected blob analysis or a normalized correlation search (both explained below) on the initial region of interest.

The normalized correlation search measures the geometric similarity between an image and a model independent of any linear differences in image or model brightness, as explained in Cognex 3000/4000/5000 Vision Tools Revision 7.6 part no. 590–0136 ("the Cognex manual") at 17–25 (1996), incorporated by reference. The connected blob analysis is an analysis of individual graphical entities defined by connectivity, as explained in the Cognex manual at 248–250, incorporated by reference.

After the initial image item is identified, a rotational alignment characteristic of the image is determined in the following way. A cartesian-to-polar ("C-P") coordinate transformation is executed for all of the image data elements (other than the initial image item's own image data elements) of a C-P transformation area such as area 76, to create a polar coordinate version such as that represented in FIG. 10 (step 2080).

The C-P transformation area is defined by two radii: an inner radius such as radius R1 that is large enough to exclude the initial image item and an outer radius such as radius R2. The outer radius is large enough that the C-P transformation area is likely to intersect at least the initial image item's immediate neighbor image items such as image items 142, 150, 152, 154, 156, and 158. For example, the outer radius may have a magnitude corresponding to the pitch value (or the longest pitch value if different pitch values are specified for the alpha and beta segments) plus half the width value (e.g., the image item radius). The initial image item's location serves as the C-P transformation's radial origin, and therefore as the radial origin of the polar coordinate version. The polar coordinate version may be conceptualized as the panoramic view one would achieve if one stood at the initial image item's location and turned in place 360 degrees.

A histogram (also referred to as a radial projection) is then derived from the polar coordinate version by accumulating, for each image data element along the perimeter of the C-P transformation area ("perimeter image data element"), the brightness level values of all of the image data elements that are located between the radial origin and the perimeter image data element (i.e., that share the perimeter image data element's angular coordinate) (step 2090). FIG. 11 is representative of the results that would be achieved by deriving such a histogram from the polar coordinate version represented in FIG. 10.

The histogram is then iteratively shifted for use in iterative correlations against the model pattern (step 2100). This is accomplished by an iterative procedure in which the histogram undergoes a correlation analysis against a model histogram for the model pattern, the histogram is shifted by an increment of degrees, and the correlation analysis and the shifting are repeated. The shifting may be limited to a range of degrees that correspond to a predetermined rotational tolerance, e.g., to −45 to +45 degrees.

In the example of FIGS. 3 and 9, immediate neighbor image items 142, 150, 152, 154, 156, and 158 have angular locations (FIG. 11) of 0, 76.5, 117, 180, 256.5, and 297 degrees, respectively. As stated above, the histogram with the angular locations is correlated with a model histogram that indicates model angular locations determined for the model pattern (step 2110). In the example of FIGS. 3 and 9, the model angular locations are 14, 90, 129, 194, 270, and 309 degrees, respectively.

After the correlating and shifting, the rotational alignment characteristic is determined to be an angular offset value representing the highest-correlating angle offset between the model angular locations and the angular locations of the immediate neighbor image items (step 2120). In the example of FIGS. 3 and 9, the correlating and shifting indicates that the angular offset value is −13.2 degrees.

Note that the angular offset value can still be determined even if one or more of the immediate neighbor image items is missing. Model angular locations without corresponding angular locations do not contribute to the angular offset value.

Next, attention is returned to the image data elements in the original Cartesian coordinates to find the locations of the immediate neighbor image items (i.e., the adjacent image items) (step 2130). For example, the location of image item 150 is found by performing the normalized correlation search on a window in the vicinity of image data elements found at the offset angle (−13.2 degrees) from the y-coordinate of the initial image item's location. In another example, the location of image item 142 is found similarly, except that the use of the offset angle is replaced by the use of a sum of the pattern angle value and the offset angle.

Alternatively, the locations may be found by using the results of the C-P transformation (which already identified the immediate neighbor image items).

Based on the locations of the initial and immediate neighbor image items, an image-to-model ("I-M") transformation scheme (including a scalar element) is developed to convert x-y coordinates in the image ("image x-y coordinates") to x-y coordinates in the model pattern ("model x-y coordinates") (step 2140). The I-M transformation scheme (and an inverse referenced below) are described in Cognex 3000/4000/5000 System Software Revision 7.4, chapter 7, p. 204 et seq., incorporated by reference. The I-M transformation scheme involves affine transformations which are explained in CRC Standard Mathematical Tables and Formulas (30th ed.), incorporated by reference.

An inverse of the I-M transformation scheme is determined, to create a model-to-image ("M-I") transformation scheme (step 2150). The inverse is derived as indicated above and according to the mathematical concept known as a pseudoinverse, which is explained in William W. Hager, Applied Numerical Linear Algebra sec. 6–11 (Prentice-Hall 1988), and in Gilbert Strang, Linear Algebra and its Applications sec. 3.4 (Academic Press 1980), both incorporated by reference. This M-I transformation scheme is used iteratively as indicated below to predict the locations of the remaining image items in the image.

The locations of all of the remaining image items are then found, by "flooding out" the pattern element from the initial image item (step 2160). For example, after image item 150 is found, image item 160 is found based on the alpha segment, the M-I transformation scheme, and the normalizing correlation search described above. In addition, as more of the remaining image items are located in other regions of interest, the M-I transformation scheme is refined to sharpen subsequent predictions of locations of further remaining image items (step 2170) and the size (i.e., the number of image data elements) used for the region of interest is reduced (step 2180). Reducing the size is possible because as the predictions are sharpened, an improvement is gained in the likelihood that the image item sought will be found exactly where it is predicted (i.e., that the image item's location will be found within the smaller region of interest). For example, FIG. 9 shows that later-used region of interest 164 is proportionately smaller (in terms of image data elements) than earlier-used region of interest 162. It is to be understood, however, that it is not necessary to reduce the size used for the region of interest. For example, the size may be held constant if doing so reduces a significant computational burden associated with changing the size.

After the locations of all of the image items have been found, an overall correspondence between the image items found and the model items is then determined as follows. A center of gravity such as center 166 (FIG. 9) is determined for the image (step 2190) and is aligned with a predetermined center of gravity such as center 168 (FIG. 3) for the model pattern (step 2200). (Note that the centers 166 and 168 are not located identically relative to their respective image and model items. This is due mainly to the fact that the image of FIG. 9 includes image item 170 that is described below.) Since the image and model items may not fully align even after the centers of gravity are aligned, shifts may be executed in the alpha and beta directions (step 2210). Preferably, shifts equal to one, two, and three shifts of the alpha segment magnitude in the positive and negative alpha directions are attempted, in combination with shifts equal to one, two, and three shifts of the beta segment magnitude in the positive and negative beta directions (step 2220). A total of 36 shifts is thus attempted, producing 36 correlation values the highest of which indicates the best correspondence position (step 2230).

In the case of FIG. 9, the best correspondence position indicates that no corresponding model item is found for image item 170, which is thus determined to be an extra image item causing the image analyzer to record a failure in the analysis results data structure. Not shown but also important is the reverse possibility where no corresponding image item is found for one or more of the model items, in which case a missing image item failure is recorded in the analysis results data structure.

Each image item is also subjected to a quality analysis. Size, shape, and location information is determined for each image item (step 2240). For instance, if each image item is expected to be circular, an edge-detection and least-squares analysis is performed for each image item to determine a best-fit circle (step 2250), as explained in George B. Thomas, Calculus and Analytic Geometry, chapter 14 (Addison-Wesley 1953), incorporated by reference. In such a case, the radius and position of the best-fit circle determine the size and precise location, respectively, of the image item, and the quality of the fit of the best-fit circle determines the degree to which the image item is circular. The quality of the fit is inversely proportional to the sum of the squares of the distances from the actual edges of the image item to the nearest point on the best-fit circle.

In the quality analysis, this determined information is compared to parameters from the analysis parameters data structure (step 2260). Such parameters indicate tolerances for errors in position, errors in size, and errors in pitch. Note that errors in position are detected independently of errors in pitch. This is done because two image items may be within position tolerances but be simultaneously too close to each other to fall within the pitch tolerances. Thus, detecting pitch and position errors independently allows an image to pass the quality analysis where, e.g., all of the image items in a row are shifted horizontally within the position tolerances.

With respect to shape, the quality analysis can detect an image item such as image item 180 that is misshapen and may not be acceptable.

The image is also analyzed for other objects that do not qualify as image items. This may be accomplished after the procedure above by masking out of the image any image data elements that correspond to image items (step 2270), and then examining the resulting masked image for anything left over (step 2280). For example, if all of the image items are masked out of FIG. 9 (i.e., if whitening is performed for all of the image data elements corresponding to the image items), image object 176 is exposed. (Alternatively, a constant golden template comparison ("GTC") method, histogram analysis, or connected blob analysis could be used to find such objects. GTC is explained in William M. Silver and Jean-Pierre Schott, Practical Golden Template Comparison (Cognex 1991), incorporated by reference). As a result, the image analyzer may record a failure in the analysis results data structure.

Figure 12:
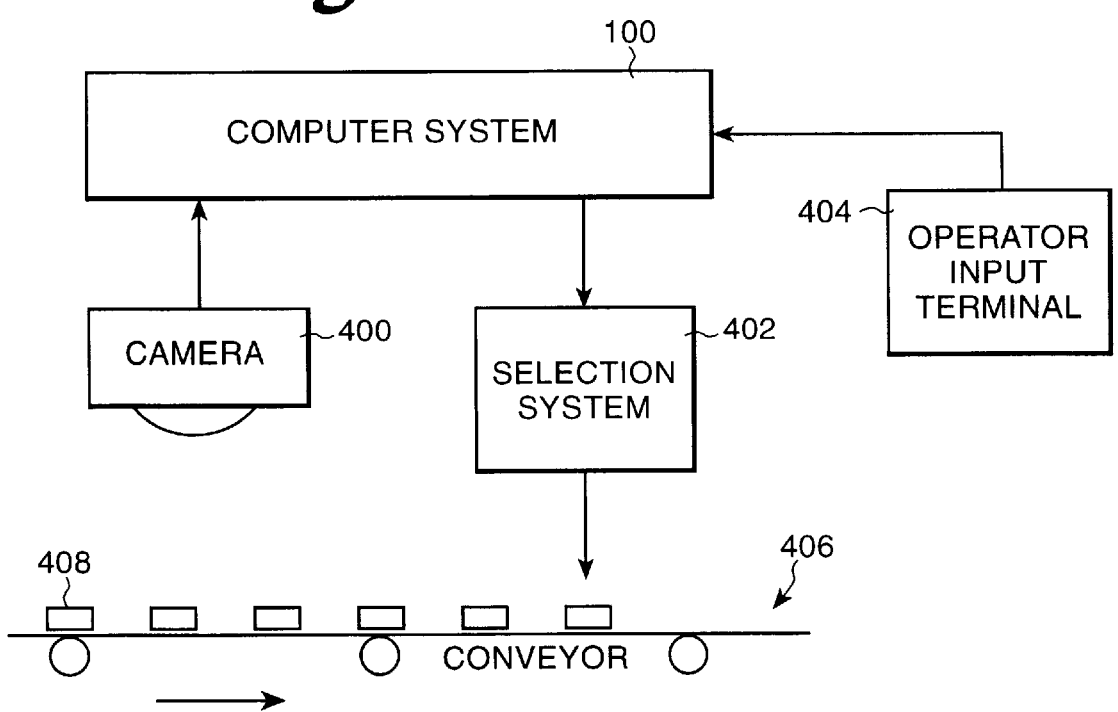
FIG. 12 is a diagram of an inspection system that includes the computer system.

The procedures, data structures, computer system, and other information described above are relevant to any application in which an image of items in a pattern is to be analyzed with respect to a model pattern. For example, as shown in FIG. 12, the computer system 100 (including all components shown in FIG. 1) may be combined with a camera 400 for automated inspection of articles 408 that are provided for inspection by a conveyor system 406 or by other means. The computer may provide the analysis results to a selection system 402 so that the selection system's treatment of each article may be affected by the analysis results (e.g., the selection system may discard an article if the analysis results indicate a failure).

Two such inspection applications are the inspection of the BGAs described above and of pill blister packs. With respect to BGAs (e.g., articles 408 in FIG. 12), the model and image items represent the solder balls expected to be found on the devices, and the other image objects (e.g., object 176 of FIG. 9) represent misplaced solder or other material that may interfere with the proper operation of the BGA device.

In preparation for BGA inspection, an operator first specifies the layout of the BGA. (The operator may specify this information graphically through the screens described below, numerically through an interactive user interface, or by a text file in a pre-determined format.) This layout specification includes the number of balls and their location and size, and its representation is preferably depicted much as a device under illumination would appear to the operator during later testing. The device under inspection is illuminated in such a fashion that all balls appear either as bright circles or as rings when viewed from the camera mounted above the plane of the device. In addition, the illumination renders the portions of the device between the balls (the "background") of approximately uniform intensity and consistently darker than the balls, while solder or other material between the balls is rendered clearly visible against this background.

The computer system may be also calibrated to the BGA before inspection. This calibration includes measuring the differences between the angle of the camera and a vector normal to the surface of the BGA. The calibration step also measures optical distortion differences as a function of the camera lens used, to allow the computer system to compensate for these differences.

In addition, the calibration maps physical dimensions to the image coordinates and image data elements. Thus, ball dimensions may be specified using physical units such as mils or millimeters, rather than image data elements.

With respect to the pill blister packs (e.g., articles 408 in FIG. 12), the model and image items represent pills expected to be found in the blister packs, and the other image objects (e.g., object 176) represent foreign objects (e.g., misplaced pill material) disposed on the blister packs. In the case of pill blister packs, the brightness level values may be replaced by or complemented with color level values so that the analysis is also able to use color to detect problems (e.g., in the case of pre-programmed daily pills, to detect that the wrong pill was inserted in a particular day's position in the pack).

Furthermore, as explained below, the pattern element may be specified for use in a circular pattern, e.g., for use with pill packs in which the pills are disposed in a circle.

As shown in FIG. 12, the computer system may be configured to accept input from an operator input terminal 404. In particular, the model pattern, the contents of the pattern parameters data structure, or the contents of the analysis parameters data structure, or any combination of these may be determined by input from the operator input terminal, which input may be provided in accordance with the input screens described below.

Figure 13:
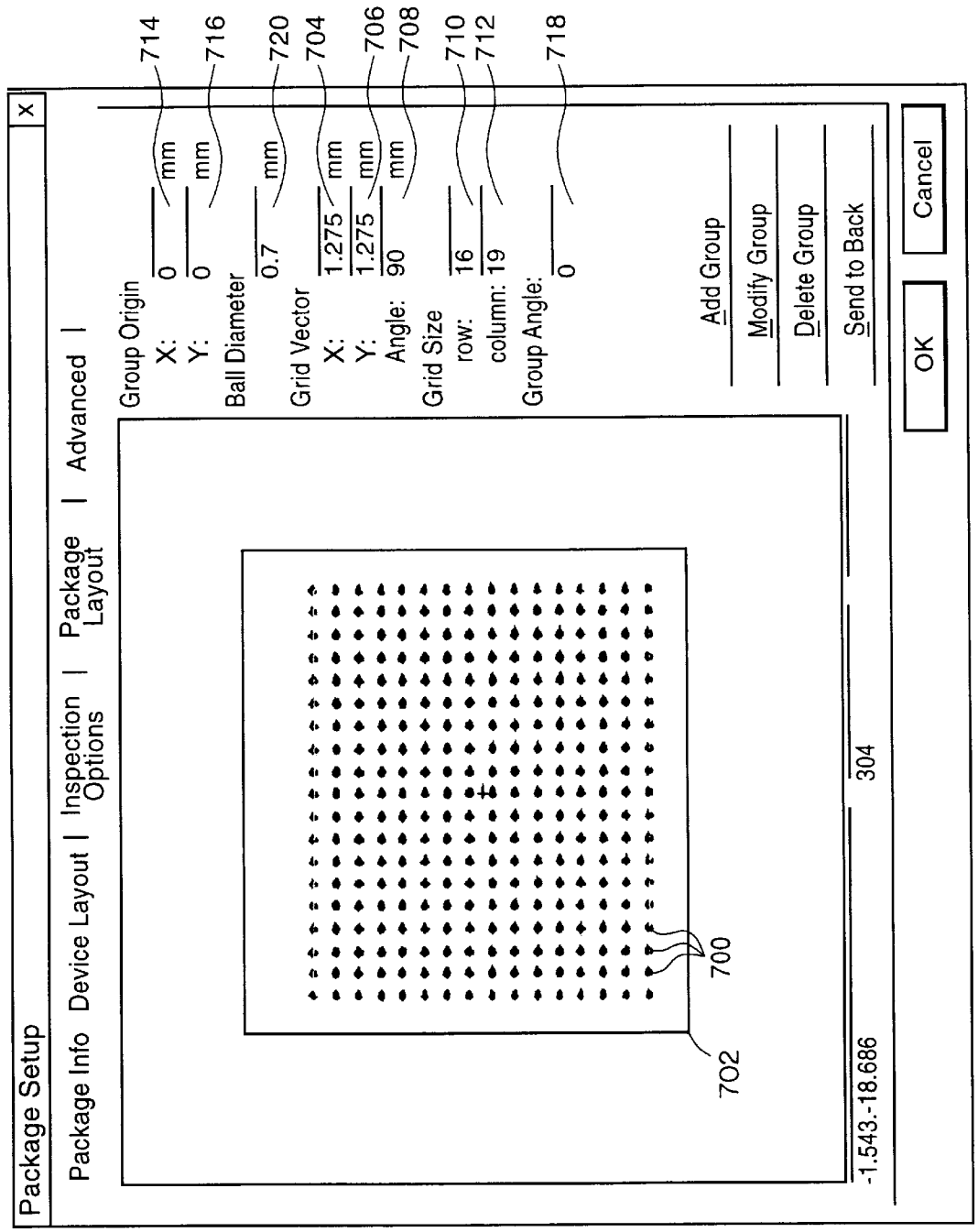
FIGS. 13–28 are diagrams of computer displays provided by the inspection system.
Figure 14:
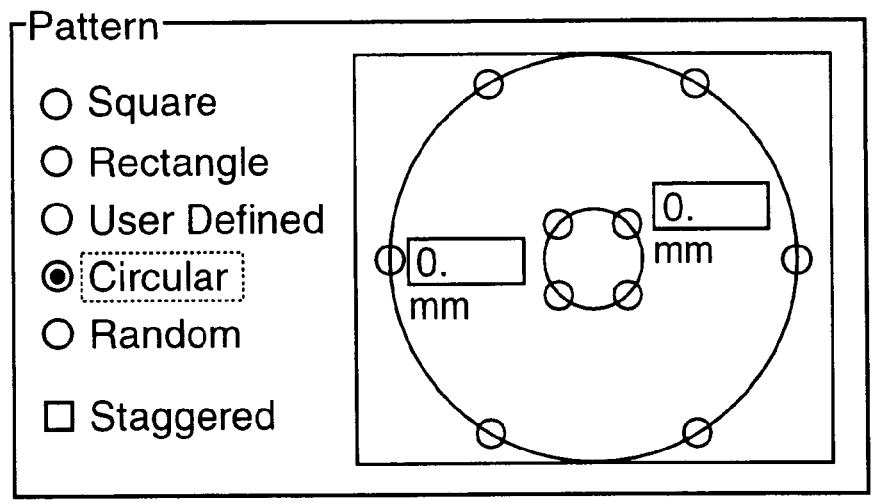
Figure 15:
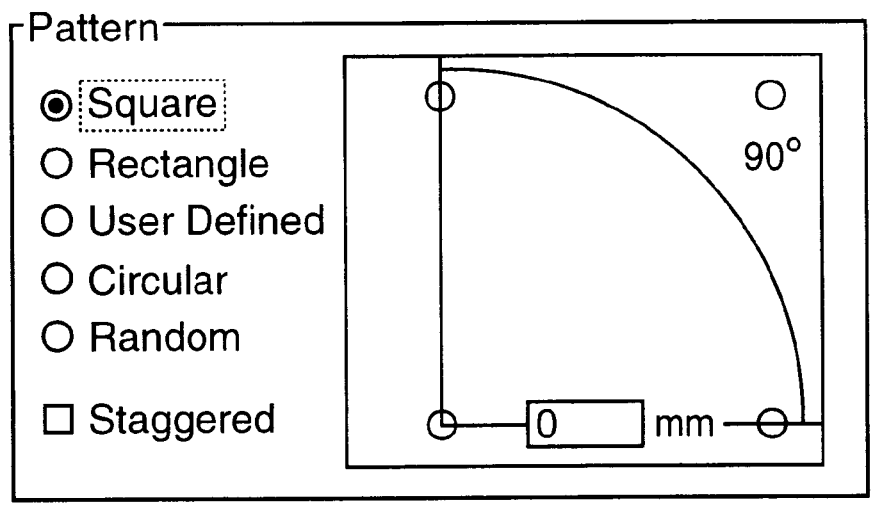
Figure 16:
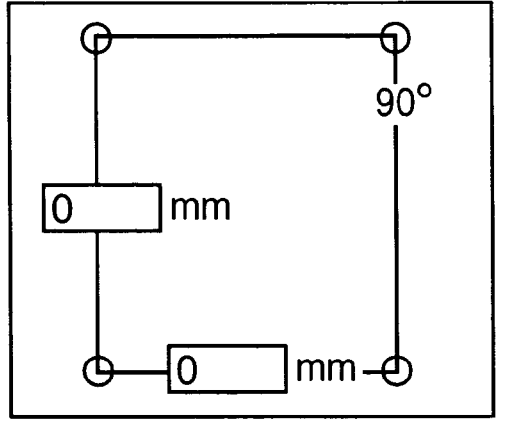
Figure 25:
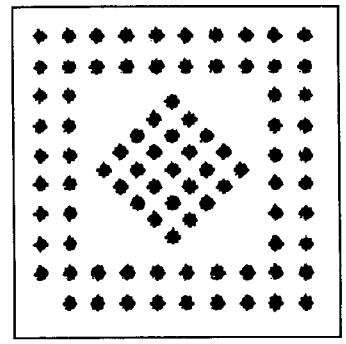

FIG. 13 shows a device layout display screen by which the operator is able to interactively affect the model pattern (also referred to as ideal pattern) such as pattern 702. For example, with a computer mouse or trackball, the operator is able to use clicks to select the device layout screen and then activate and de-activate particular model items (exemplified by model items 700) individually or by selected group (e.g., the interior diamond-shaped group in FIG. 25) which may or may not be contiguous. In addition, by providing information in entry boxes 704, 706, and 708, the operator is able to specify the alpha, beta, and pattern angle values, respectively. The operator is also able to select the alpha and beta factors by entering data in entry boxes 710 and 712, respectively. For different groups such as the diamond-shaped group and a double border group of FIG. 25, different group origins and angles may also be specified by entering data in entry boxes 714, 716, 718, respectively. Finally with respect to FIG. 13, the width of the model item may be specified by entering data in entry box 720.

Figure 17:
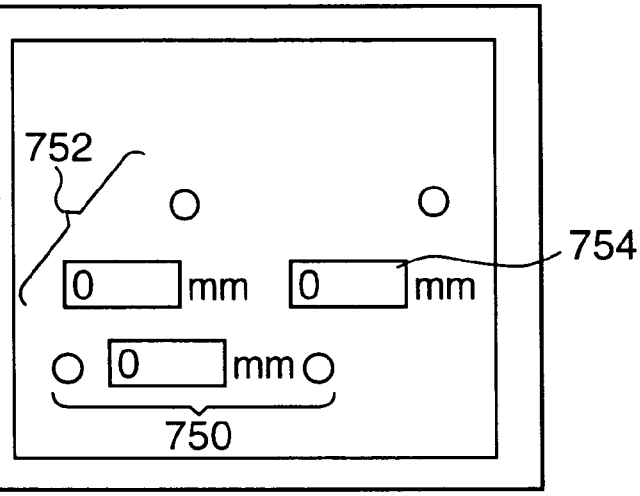

As illustrated in FIGS. 14–17, the operator can also specify different styles of pattern elements, including the circular pattern element noted above. FIG. 17 shows a displayed fragment of the ideal pattern, with lineargraphical indicators 752, 750 and an angle indicator 754 signifying key distances in the ideal pattern. Each of the indicators 75–754 is associated with any entry box for data entry by the operator.

Figure 18:
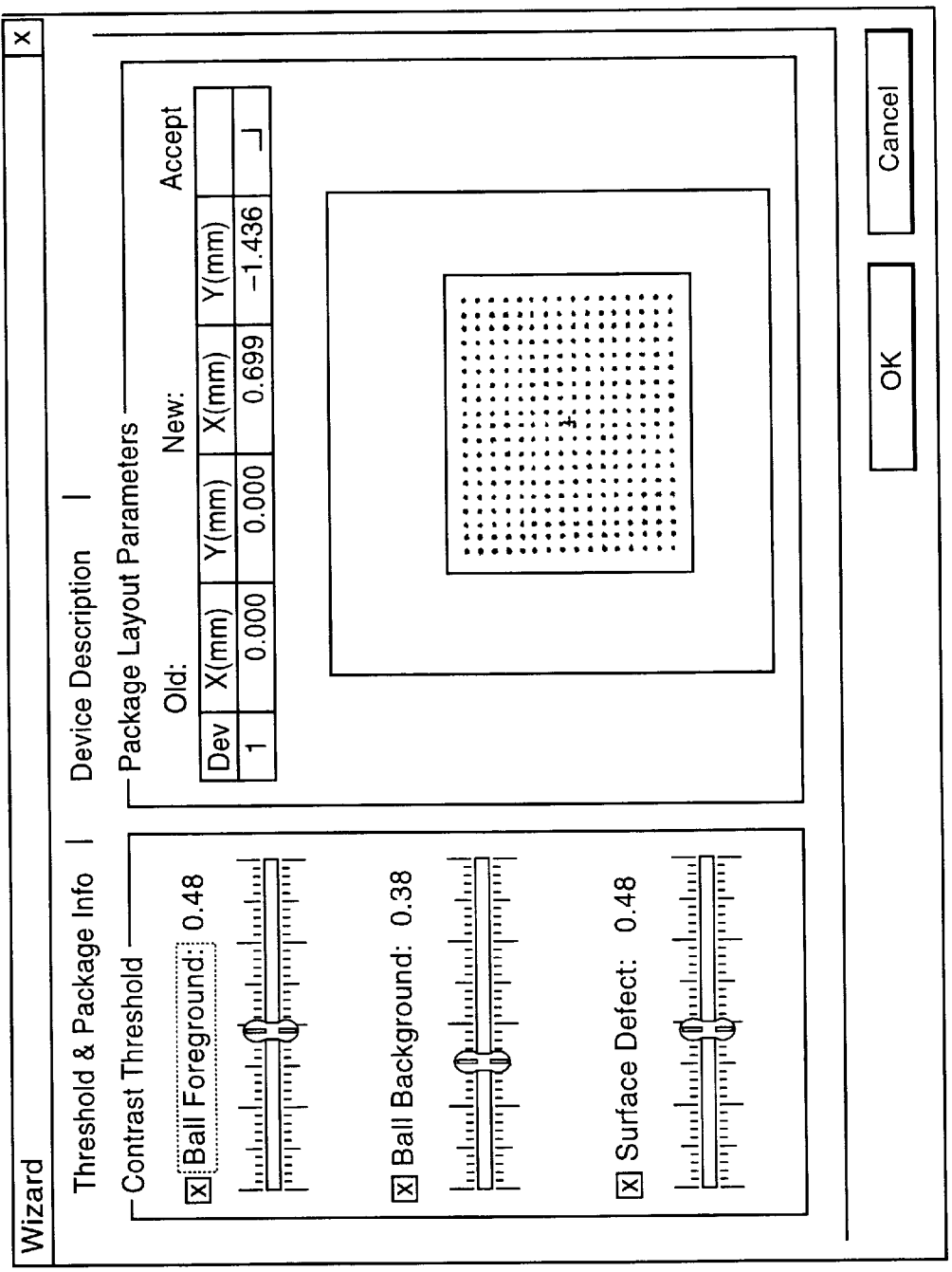

Further, according to the screen shown in FIG. 18, the operator is able to use sliding ruler displays to specify contrast thresholds for image item detection, background detection (e.g., the white areas of FIG. 9), and detection of surface defects (e.g., object 176 of FIG. 9). For example, the brightness level values referenced above may be in a range that is narrow which creates difficulties for distinguishing between image display elements that are associated with image items and image display elements that are not. If so, the operator can specify contrast thresholds that distinguish even within the narrow range.

Figure 19:
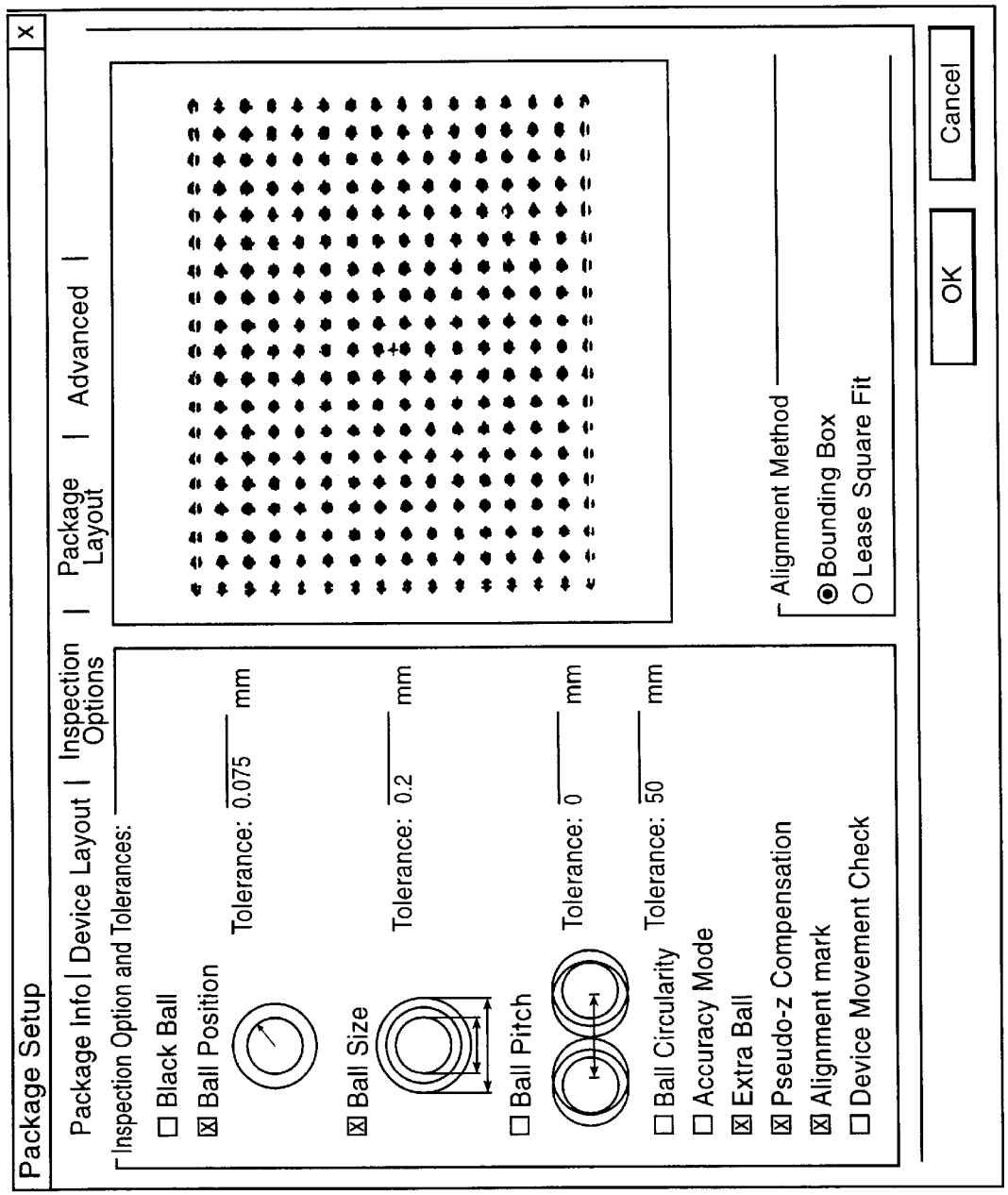

FIG. 19 shows that the operator can specify the tolerances for the image item quality analysis. The tolerances include tolerances for position, size, and pitch.

Figure 20:
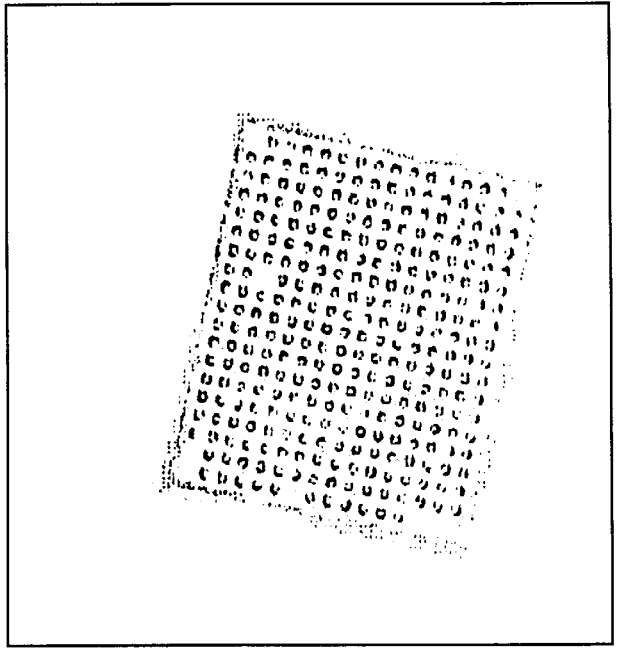

The results of an inspection can be displayed for each image item found, as shown in FIG. 20. For example, image item 3 has x- and y-positions of −8.945 and 9.568 respectively, a width or diameter of 0.768, a positional error value of 0.0210, a width error value of 0.0680, and a circularity value of 100.

Figure 21:
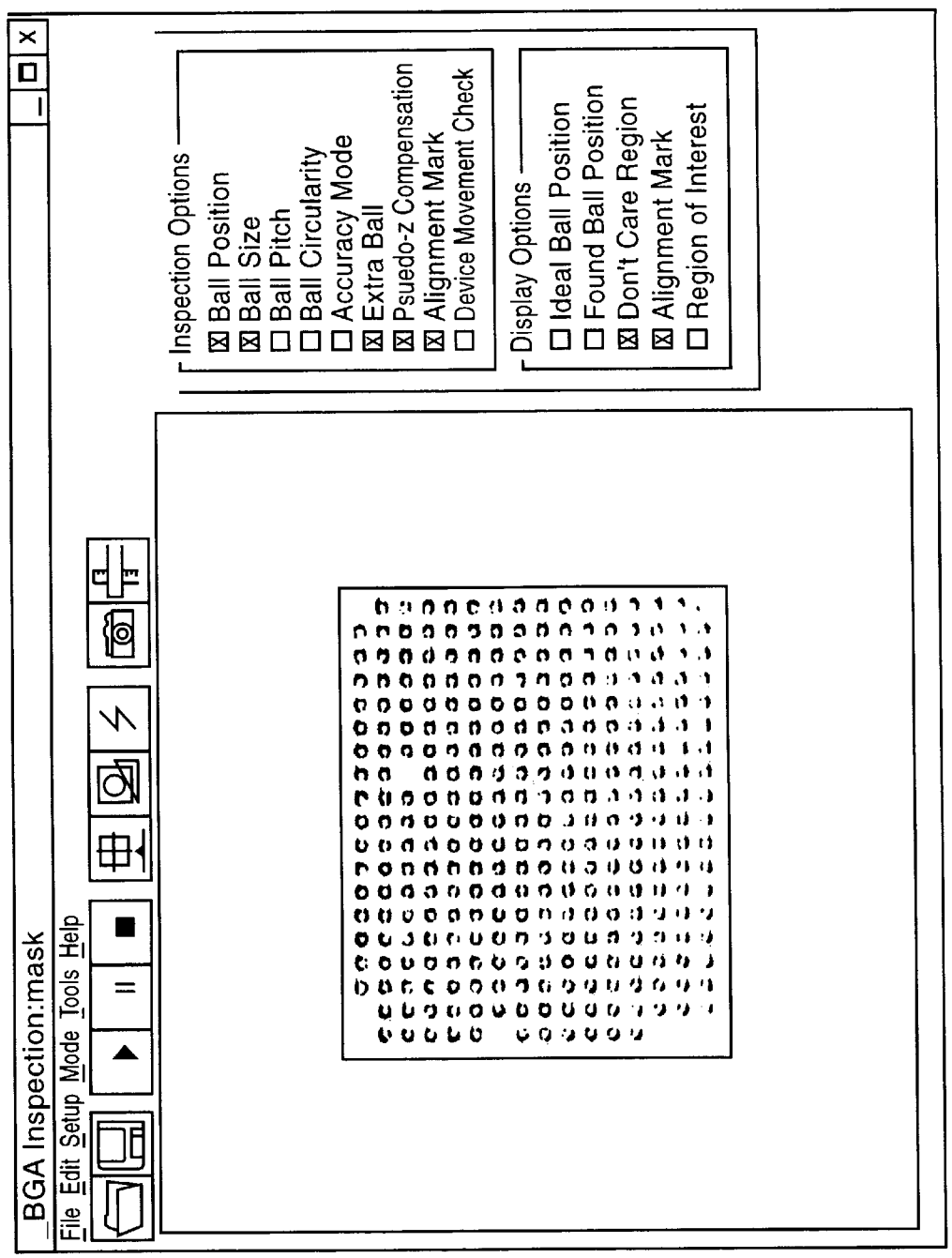

FIG. 21 illustrates the results of a masking operation allowing the selection of inspection options such as item position, size, pitch, and circularity. In addition, one or more "don't care" regions may be specified where inspection is not necessary.

Figure 22:
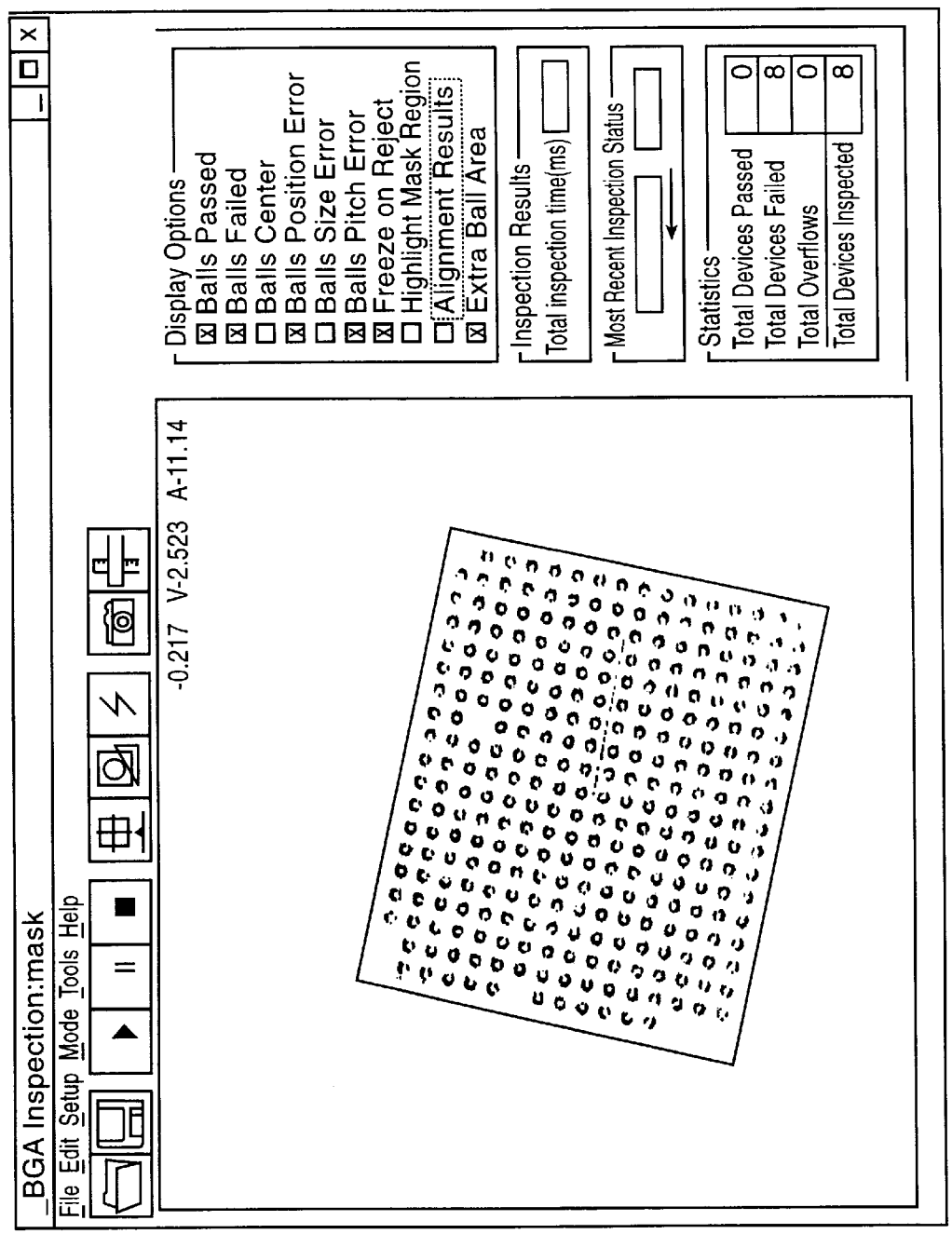

The total inspection time and the most recent inspection status may be displayed in graphical format as shown in FIG. 22. In addition, inspection statistics may be displayed to show the number of inspections and the numbers of passes and failures involved.

Figure 23:
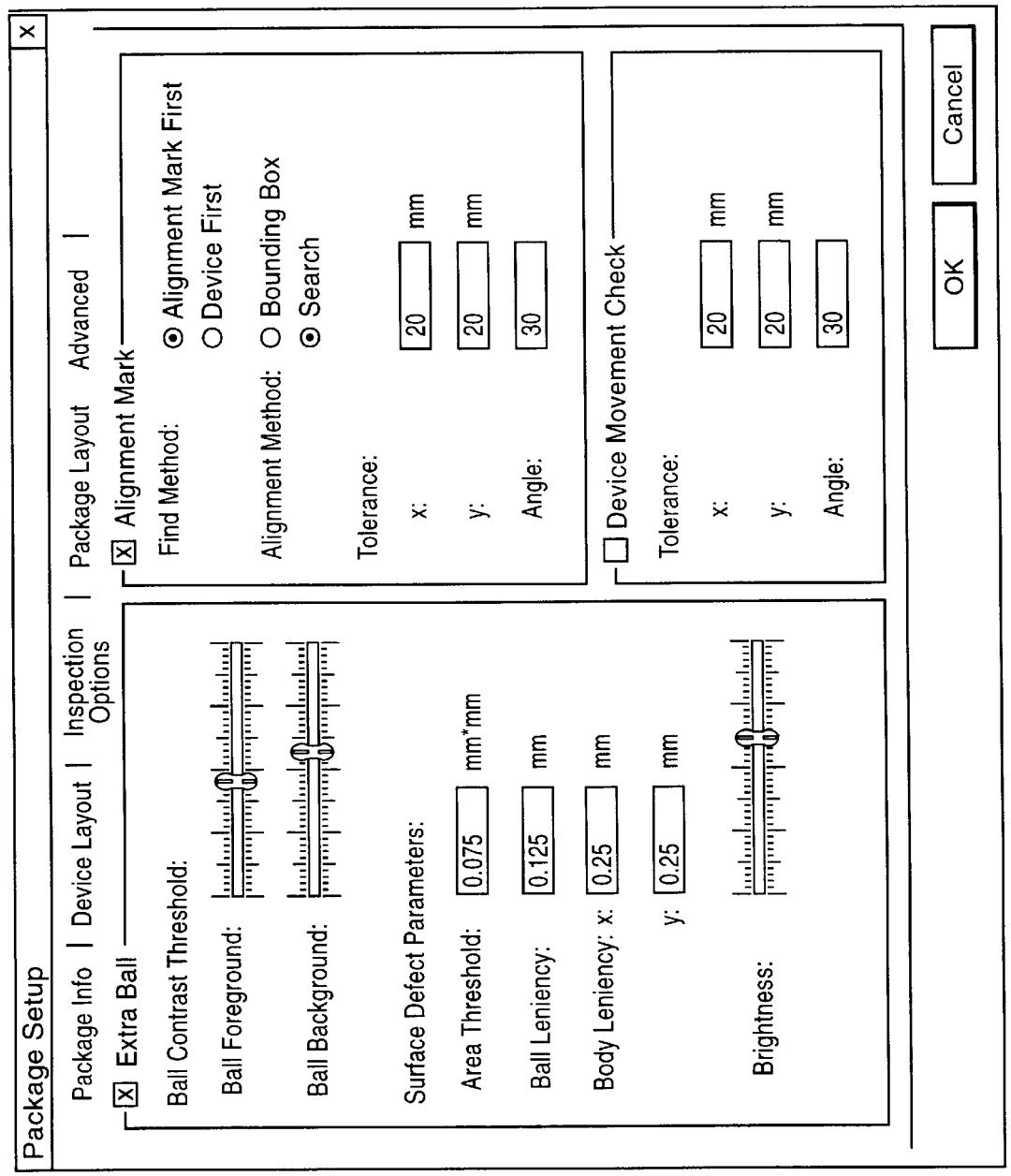

FIG. 23 indicates that surface defect parameters may be specified for area threshold, image item leniency, and body leniency. In addition, x, y, and angle tolerances may be specified for device movement check.

Figure 24:
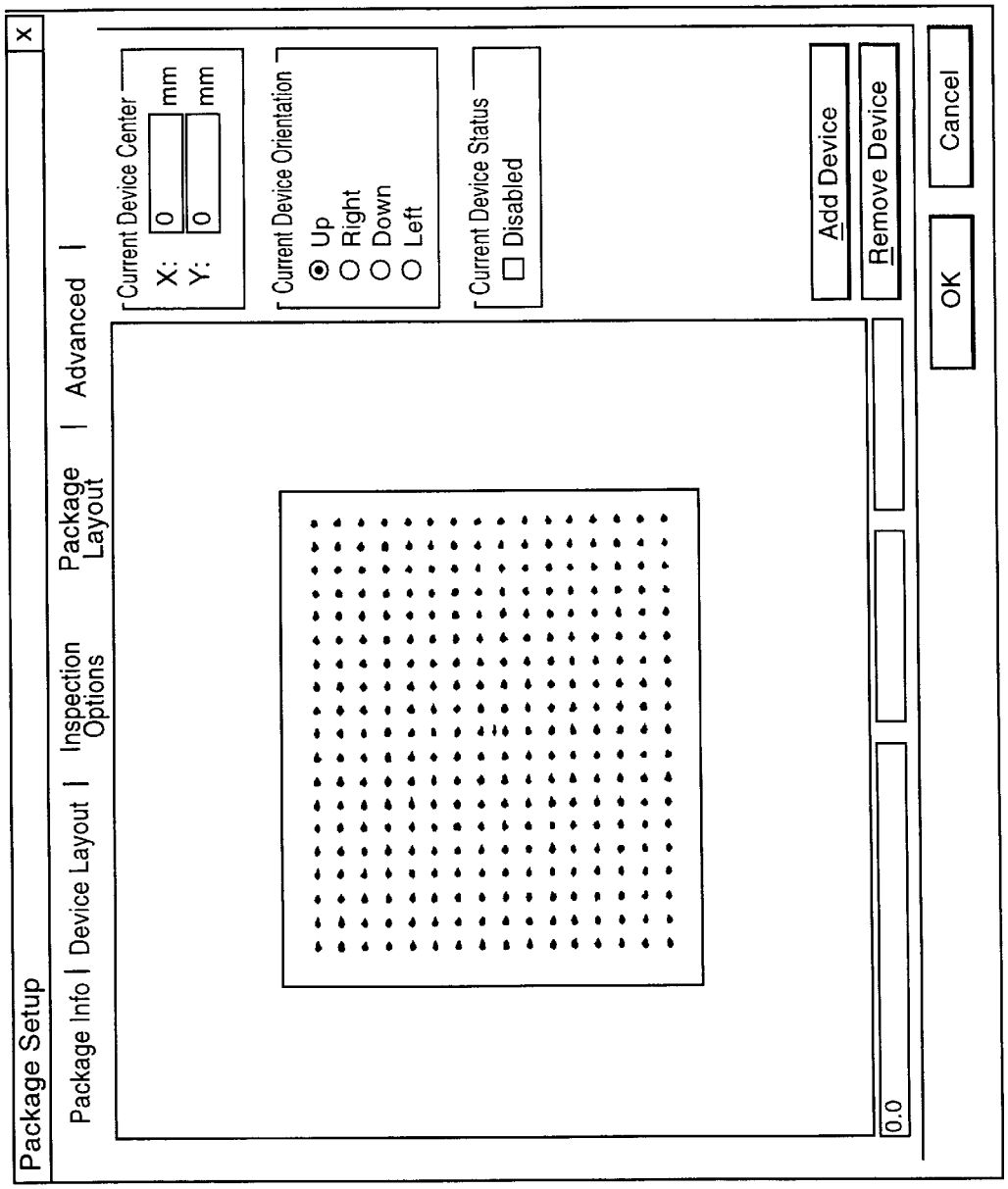

A device center and a device orientation may be specified for the ideal pattern, as shown in FIG. 24.

As described above, FIG. 25 shows that the operator may specify multiple groups of image items, with each group corresponding to the same or a different pattern element. The multiple groups of FIG. 25 may be created by producing a 10×10 ideal pattern, de-activating a 6×6 central region and the upper left item to produce the double border group, and then positioning the 5×5 diamond pattern within the double border group.

Figure 26:
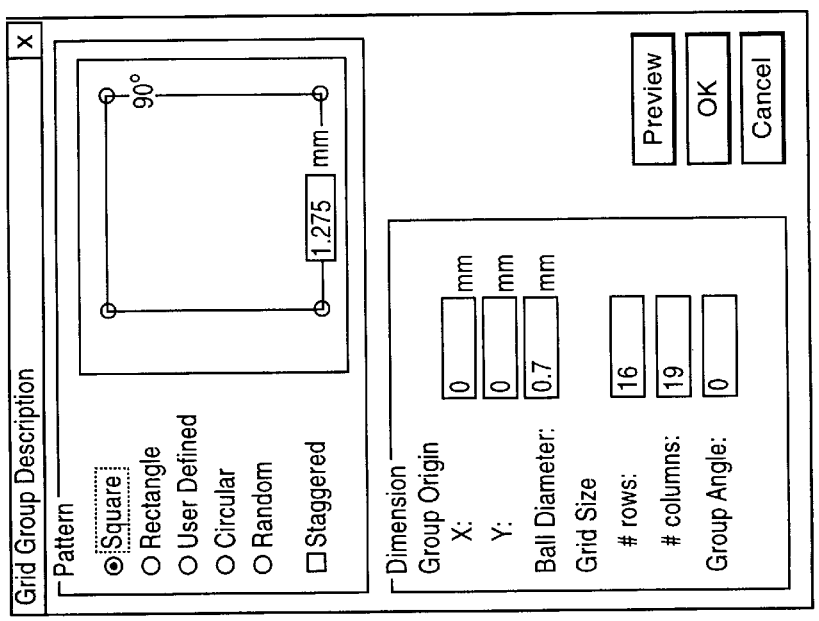

FIG. 26 shows that the grid size may be changed and that the entire ideal pattern may be previewed after the pattern element is defined.

Figure 27:
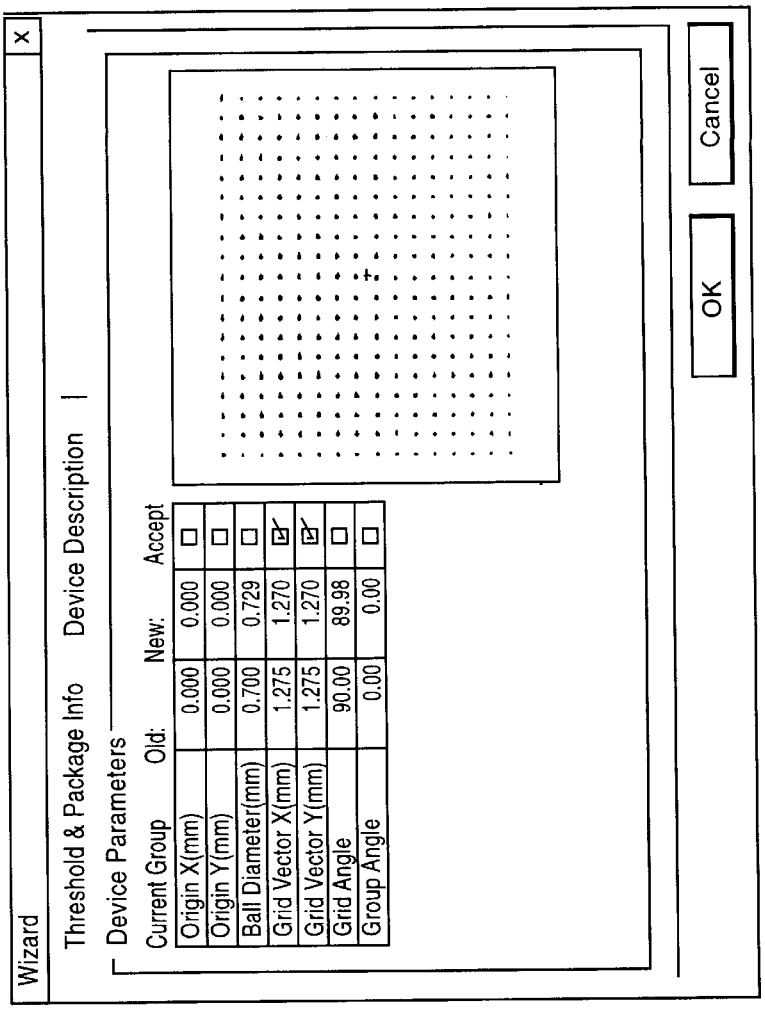

As shown in FIG. 27, the operator can create a new device description based on an old device description and current image.

Figure 28:
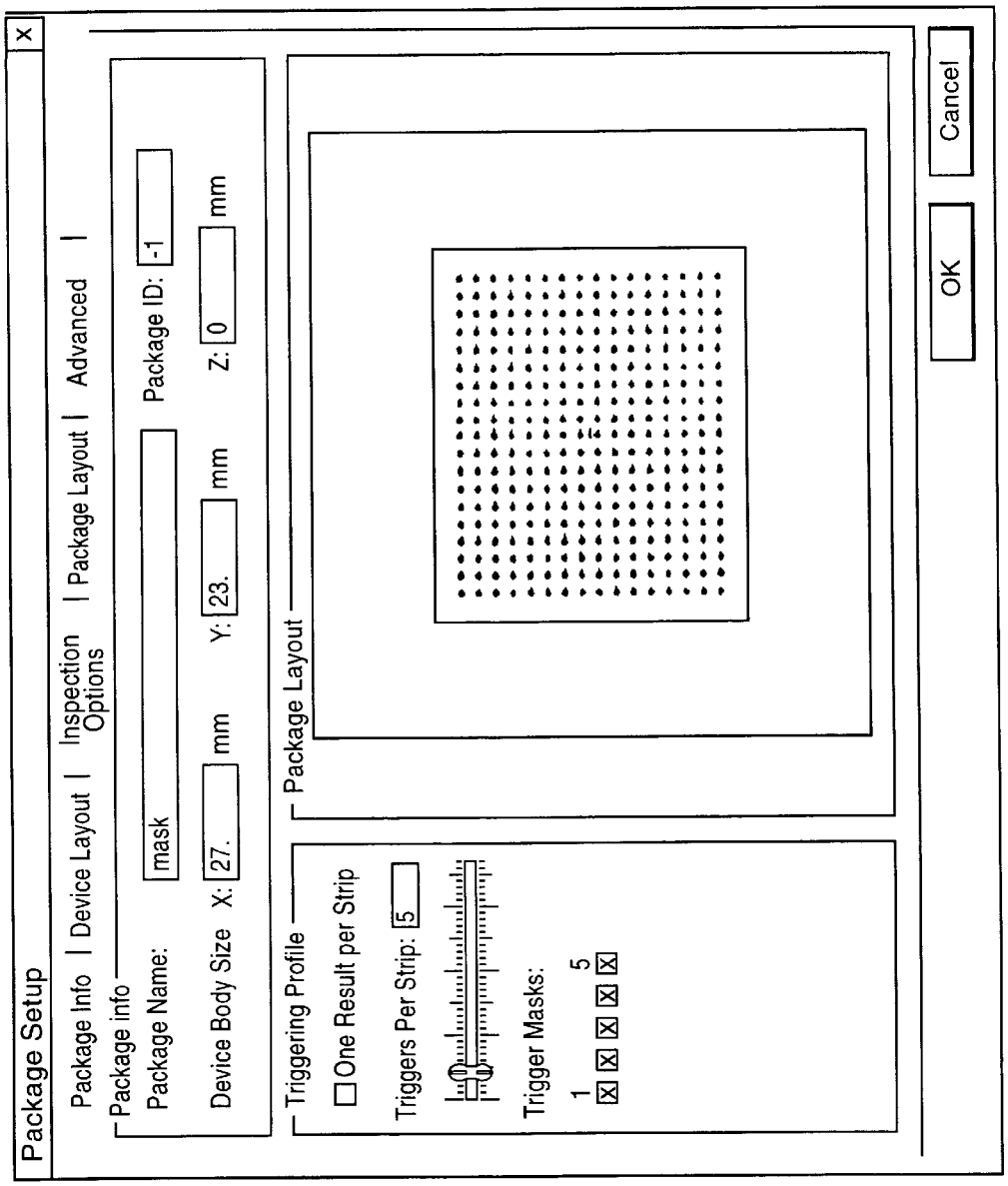

FIG. 28 shows that the operator can specify a body size and a triggering profile for the device to be inspected.

The computer system 100 may have a main processor 105 ("CPU") such as an Intel® 486, Pentium®, Pentium® Pro, or Pentium® II processor and may run software including an operating system (i.e., operating environment software) such as Microsoft® Windows® NT, Microsoft® Windows®95, UNIX®, OS/2®, or Java™. The camera 400 may include a Sony XC-75 camera.

The technique (i.e., the procedure described above) may be implemented in hardware or software, or a combination of both. Preferably, the technique is implemented in computer programs (such as the monitor software and script engine software described above) executing on programmable computers that each include a processor, a storage medium readable by the processor (including volatile and non-volatile memory and/or storage elements), at least one input device such as a keyboard, and at least one output device. Program code is applied to data entered using the input device to perform the method described above and to generate output information. The output information is applied to one or more output devices such as a display screen of the client computer.

Each program is preferably implemented in a high level procedural or object-oriented programming language such as Microsoft C or C++ to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, sections of the procedure may be re-arranged in a different order, e.g., the quality analysis may be performed on each image item as soon as the image item is found. Such a re-arrangement may be useful for saving time in circumstances where, e.g., image item deformity is a more significant problem than the problems of missing, extra, or misplaced image items. Other examples include detecting leftover image objects by GTC before analyzing the degree to which the image item is circular (if circularity is well-controlled or unnecessary), and, in the blister pack case, analyzing the color of the image items before analyzing their shapes. The grid need not be rectangular and may be hexagonal, triangular, circular, or of some other form.

What is claimed is:

1. A computer-based method of analyzing an image of an actual pattern of discrete balls of a ball grid array with respect to a model representing a predefined ideal pattern of the balls arranged on a regular grid, the image comprising a set of digital data representing an array of pixels of the image, the method comprising:

arranging the model to express locations of the balls in terms of model vectors which represent standard spacings of the balls along two dimensions and fill information indicating the existence or nonexistence of a ball at each location of an array defined by the model vectors, performing initial processing of only a portion of the image, the portion corresponding to original neighborhood balls located in an original neighborhood within the image, to determine information about an affine transformation of the actual pattern of the balls relative to the predefined ideal pattern, the initial processing comprising identifying a first neighborhood ball in the image, and identifying locations of adjacent neighborhood balls in the original neighborhood relative to the first ball, performing additional processing of other portions of the image based on the results of the initial processing, including deriving information about additional balls, the additional balls being located in the other portions of the image and being farther away from the first ball Than are the original neighborhood balls wherein the performing additional processing of the other portions based on the results of the initial processing reduces the processing required for the additional balls, and performing ball inspection using the image, to compare the balls in the image against a predefined standard.

2. The method according to claim 1, wherein the initial processing comprises confirming that the first neighborhood ball is indeed one of said discrete balls, and identifying locations of adjacent neighborhood balls relative to the first neighborhood ball.

3. The method according to claim 2, wherein the initial processing comprises analyzing locations of the first neighborhood ball and the adjacent neighborhood balls to determine information about an affine transformation of the pattern of balls.

4. The method according to claim 3, wherein the locations of the adjacent neighborhood balls are expressed relative to the first ball in radial and angular coordinates.

5. The method according to claim 4, wherein the analyzing comprises matching the angular coordinate information against the model to determine a rotational element of the affine transformation.

6. The method according to claim 5, wherein the analyzing comprises matching the radial coordinate information against the model to determine a scalar element of the affine transformation.

7. The method according to claim 5, wherein the analyzing comprises operating only on information of the digital representation that falls within a window in the vicinity of one of the neighborhood balls, and determining the radial coordinate information based on results of the operating.

8. The method according to claim 1, wherein the set of discrete objects is arranged on a regular grid.

9. The method according to claim 8, wherein the regular grid is rectangular.

* * * * *